(12) United States Patent
Hirobe et al.

(10) Patent No.: US 12,025,967 B2
(45) Date of Patent: Jul. 2, 2024

(54) CONTROL SYSTEM AND SETTING METHOD

(71) Applicant: OMRON Corporation, Kyoto (JP)

(72) Inventors: Naoki Hirobe, Kyoto (JP); Yuta Nagata, Kusatsu (JP); Yutaka Tahara, Ritto (JP)

(73) Assignee: OMRON Corporation, Kyoto (JP)

( * ) Notice: Subject to any disclaimer, the term of this patent is extended or adjusted under 35 U.S.C. 154(b) by 309 days.

(21) Appl. No.: 17/437,827

(22) PCT Filed: Feb. 20, 2020

(86) PCT No.: PCT/JP2020/006824
§ 371 (c)(1),
(2) Date: Sep. 9, 2021

(87) PCT Pub. No.: WO2020/202882
PCT Pub. Date: Oct. 8, 2020

(65) Prior Publication Data
US 2022/0155747 A1   May 19, 2022

(30) Foreign Application Priority Data
Mar. 29, 2019   (JP) ................. 2019-066006

(51) Int. Cl.
*G05B 19/05* (2006.01)
*G06F 21/71* (2013.01)

(52) U.S. Cl.
CPC .......... *G05B 19/058* (2013.01); *G06F 21/71* (2013.01); *G05B 2219/14006* (2013.01)

(58) Field of Classification Search
CPC ........ G05B 19/058; G05B 2219/14006; G05B 19/0425; G06F 21/71; G06F 2221/034; G06F 21/577; G06F 21/554
See application file for complete search history.

(56) References Cited

U.S. PATENT DOCUMENTS

| | | | | |
|---|---|---|---|---|
| 10,681,060 | B2* | 6/2020 | Scheidler | G06N 20/00 |
| 2007/0113281 | A1* | 5/2007 | Leach | G06Q 40/08 |
| | | | | 726/22 |

(Continued)

FOREIGN PATENT DOCUMENTS

| | | |
|---|---|---|
| CN | 102799834 | 11/2012 |
| CN | 106960269 | 7/2017 |

(Continued)

OTHER PUBLICATIONS

"International Search Report (Form PCT/ISA/210) of PCT/JP2020/006824," mailed on Apr. 7, 2020, with English translation thereof, pp. 1-4.

(Continued)

*Primary Examiner* — Ziaul Karim
(74) *Attorney, Agent, or Firm* — JCIPRNET

(57) ABSTRACT

A control system including a controller system and a support device is provided. The controller system controls a control target. The support device supports setting of the controller system. The support device includes a system-configuration input part, a threat analysis database, a threat-scenario creating part, a countermeasure database, a countermeasure creating part, and a security setting part. The countermeasure creating part creates a countermeasure scenario containing a countermeasure for each of protected assets of the controller system according to a threat scenario and countermeasures of the countermeasure database.

20 Claims, 33 Drawing Sheets

(56) References Cited

U.S. PATENT DOCUMENTS

| | | | | |
|---|---|---|---|---|
| 2007/0192867 A1* | 8/2007 | Miliefsky | ............ | G06F 21/577 |
| | | | | 726/25 |
| 2013/0298192 A1* | 11/2013 | Kumar | ................ | H04L 63/1425 |
| | | | | 726/25 |
| 2014/0137257 A1* | 5/2014 | Martinez | ............ | H04L 63/1433 |
| | | | | 726/25 |
| 2015/0295944 A1 | 10/2015 | Yunoki et al. | | |
| 2017/0091462 A1* | 3/2017 | Kurauchi | ............ | H04L 63/1433 |

FOREIGN PATENT DOCUMENTS

| | | |
|---|---|---|
| CN | 108259449 | 7/2018 |
| JP | 2000137506 | 5/2000 |
| JP | 2009230278 | 10/2009 |
| KR | 20190001325 | 1/2019 |
| WO | 2015001594 | 1/2015 |
| WO | 2017222553 | 12/2017 |

OTHER PUBLICATIONS

"Written Opinion of the International Searching Authority (Form PCT/ISA/237) of PCT/JP2020/006824," mailed on Apr. 7, 2020, with English translation thereof, pp. 1-6.

"Search Report of Europe Counterpart Application", issued on Nov. 22, 2022, pp. 1-9.

Office Action of Japan Counterpart Application, with English translation thereof, issued on Jun. 28, 2022, pp. 1-4.

"Office Action of China Counterpart Application", issued on Nov. 11, 2023, with English translation thereof, pp. 1-22.

* cited by examiner (a)
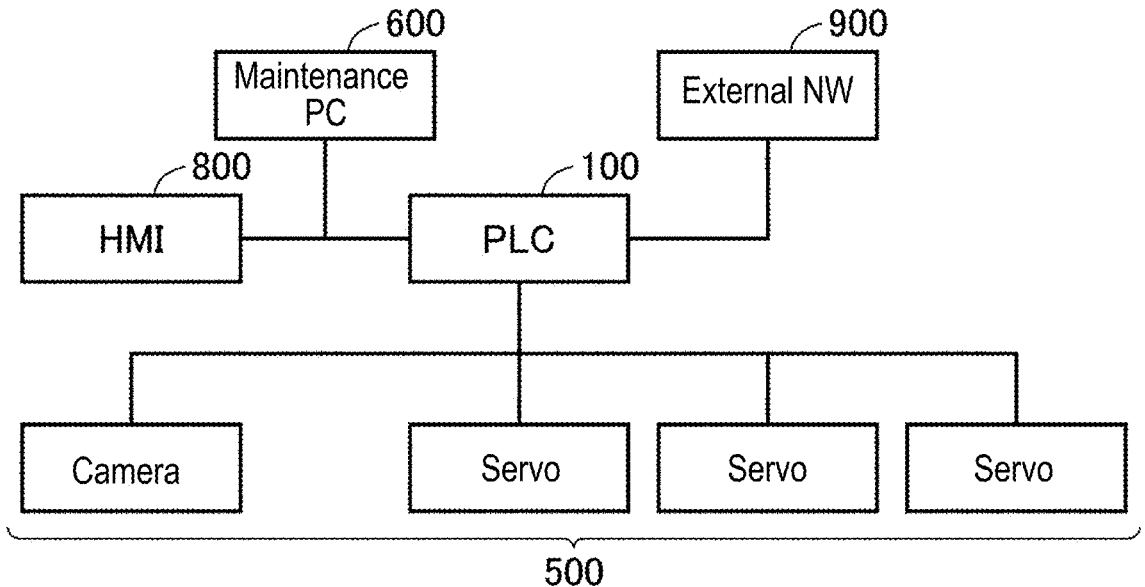
(b)
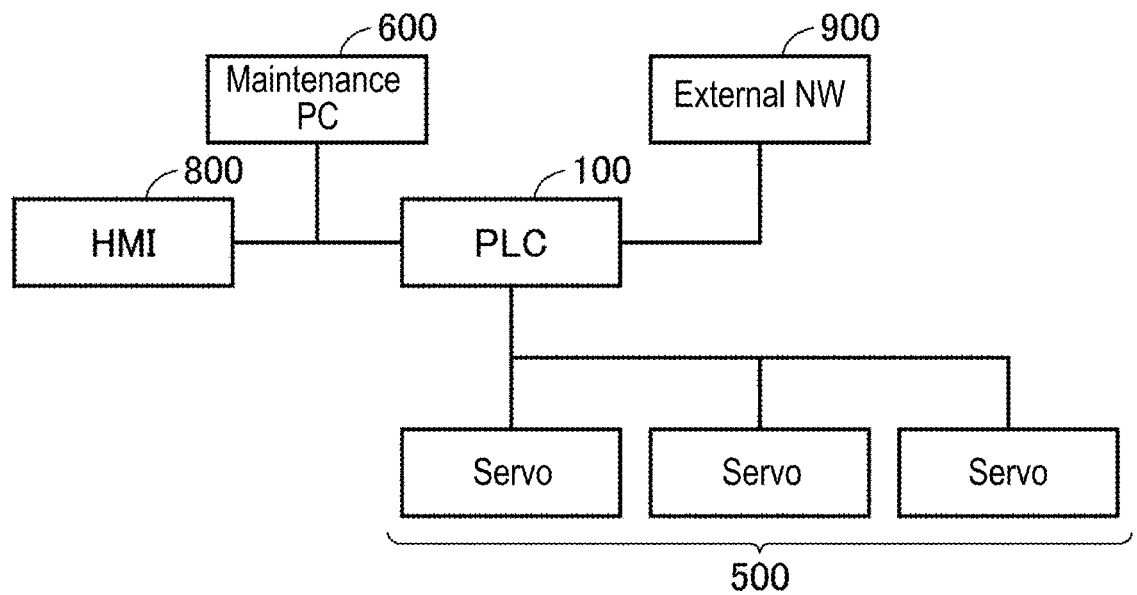
FIG. 10

Protected asset evaluation list (a)

| HMI protected asset | Attribute | Importance level |
|---|---|---|
| Device status display function | Function | 4 |
| Device operation status data | Information | 4 |
| PLC protected asset | Attribute | Importance level |
| Device control | Function | 5 |
| User program | Information | 5 |
| Control information | Information | 3 |
| System configuration information | Information | 2 |
| Component setting | Information | 2 |
| Operation history | Information | 1 |
| Camera protected asset | Attribute | Importance level |
| Camera function | Function | 3 |
| Camera screen | Information | 3 |
| Servo protected asset | Attribute | Importance level |
| Servo function | Function | 3 |
| Control instruction data | Information | 3 |

FIG. 12

Protected asset evaluation list (b)

| HMI protected asset | Attribute | Importance level |
|---|---|---|
| Device status display function | Function | 5 |
| Device operation status data | Information | 3 |
| PLC protected asset | Attribute | Importance level |
| Device control | Function | 5 |
| User program | Information | 4 |
| Control information | Information | 5 |
| System configuration information | Information | 2 |
| Component setting | Information | 2 |
| Operation history | Information | 1 |
| Servo protected asset | Attribute | Importance level |
| Servo function | Function | 5 |
| Control instruction data | Information | 5 |

FIG. 13

Threat list (a)

| (1) Attack source | Threat | Target attribute | Threat level |
|---|---|---|---|
| External NW | Communication DoS attack (Ether/IP) | Function | 3 |
| | Communication data eavesdropping | Information | 4 |
| | Communication data tampering | Information | 2 |
| Unauthorized component connection | Communication DoS attack (Ether/IP) | Function | 2 |
| | Communication data eavesdropping | Information | 2 |
| | Communication data tampering | Information | 2 |

| (2) Attack source | Threat | Target attribute | Threat level |
|---|---|---|---|
| Memory card | Firmware tampering | Information | 4 |
| | User program theft | Information | 4 |
| Maintenance PC | Malware caused malfunction | Function | 4 |
| | Data theft | Information | 4 |
| | Communication data tampering | Information | 3 |

| (3) Attack | Threat | Target attribute | Threat level |
|---|---|---|---|
| Camera | Camera hijacking | Function | 3 |
| | Screen tampering | Information | 1 |
| Servo | Servo function stop | Function | 3 |
| | Servo control data tampering | Information | 2 |

FIG. 15

Threat list (b)

| (1) Attack source | Threat | Target attribute | Threat level |
|---|---|---|---|
| External NW | Communication DoS attack (Ether/IP) | Function | 3 |
| | Communication data eavesdropping | Information | 4 |
| | Communication data tampering | Information | 2 |
| Unauthorized component connection | Communication DoS attack (Ether/IP) | Function | 3 |
| | Communication data eavesdropping | Information | 3 |
| | Communication data tampering | Information | 3 |

| (2) Attack source | Threat | Target attribute | Threat level |
|---|---|---|---|
| Memory card | Firmware tampering | Information | 5 |
| | User program theft | Information | 5 |
| Maintenance PC | Malware caused malfunction | Function | 5 |
| | Data theft | Information | 5 |
| | Communication data tampering | Information | 5 |

| (3) Attack | Threat | Target attribute | Threat level |
|---|---|---|---|
| Servo | Servo function stop | Function | 4 |
| | Servo control data tampering | Information | 4 |

FIG. 16

Threat list (c)

| (1) Attack source | Threat | Target attribute | Version | Threat level |
|---|---|---|---|---|
| External NW | Communication DoS attack (Ether/IP) | Function | 1.2 | 2 |
| | Communication data eavesdropping | Information | 1.2 | 3 |
| | Communication data tampering | Information | 1.2 | 1 |
| Unauthorized component connection | Communication DoS attack (Ether/IP) | Function | 1.2 | 2 |
| | Communication data eavesdropping | Information | 1.2 | 2 |
| | Communication data tampering | Information | 1.2 | 2 |

| (2) Attack source | Threat | Target attribute | Version | Threat level |
|---|---|---|---|---|
| Memory card | Firmware tampering | Information | 1.2 | 5 |
| | User program theft | Information | 1.2 | 5 |
| Maintenance PC | Malware caused malfunction | Function | 1.2 | 5 |
| | Data theft | Information | 1.2 | 5 |
| | Communication data tampering | Information | 1.2 | 5 |

| (3) Attack | Threat | Target attribute | Version | Threat level |
|---|---|---|---|---|
| Servo | Servo function stop | Function | 2.0 | 3 |
| | Servo control data tampering | Information | 2.0 | 3 |

FIG. 17

Threat scenario list

| Protected asset (importance level) | Threat (threat level) | Risk value |
|---|---|---|
| Device function (5) | DoS attack (5) | 25 |
| Device function (5) | Identity theft (2) | 10 |
| User program (4) | Eavesdropping (5) | 20 |
| User program (4) | Tampering (3) | 12 |
| User program (4) | Reverse engineering (2) | 8 |

Countermeasure requirement risk level 15 or higher
Sorting after determination

Threat scenario list

| Protected asset (importance level) | Threat (threat level) | Risk value | Countermeasure required |
|---|---|---|---|
| Device function (5) | DoS attack (5) | 25 | Yes |
| User program (4) | Eavesdropping (5) | 20 | Yes |
| User program (4) | Tampering (3) | 12 | No |
| Device function (5) | Identity theft (2) | 10 | No |
| User program (4) | Reverse engineering (2) | 8 | No |

FIG. 18

Threat countermeasure list (a)

| Threat | Attribute | Countermeasure | | | | | |
|---|---|---|---|---|---|---|---|
| | | Technique (Security function) | Resource | Version | Effect threat level | Application | Effect threat level |
| DoS attack | Function | Filtering | 10 | 1.0 | 2 | Redundant system—stop | 3 |
| DoS attack | Function | IDS-isolation | 50 | 1.2 | 1 | Redundant system—stop | 3 |
| Identity theft | Information | Device, user authentication | 10 | 1.0 | 2 | Accessible member only | 3 |
| Identity theft | Information | Two-factor authentication | 30 | 1.1 | 2 | Accessible member only | 3 |
| Eavesdropping | Information | Encryption | 20 | 1.0 | 2 | Blocking wired communication /port | 2 |
| Tampering | Information | Message authentication | 30 | 1.2 | 2 | Accessible member only | 2 |
| Reverse engineering | Information | Anti-tamper device | 50 | 1.3 | 1 | Locking management of device | 2 |

Countermeasure requirement risk level 10 or higher
Device version = 1.3
Resource = may be equipped with all functions Countermeasure scenario (b)

| Protected asset (importance level) | Threat (threat level) | Risk value | Countermeasure required | Countermeasure | Resource | Effect value | Post-countermeasure risk value |
|---|---|---|---|---|---|---|---|
| Device function (5) | DoS attack (5) | 25 | Yes | IDS-isolation | 50 | 1 | 5 |
| User program (4) | Eavesdropping (5) | 20 | Yes | Encryption | 20 | 2 | 8 |
| User program (4) | Tampering (3) | 12 | Yes | Message authentication | 30 | 2 | 8 |
| Device function (5) | Identity theft (2) | 10 | Yes | Device, user authentication | 10 | 2 | 10 |
| User program (4) | Reverse engineering (2) | 8 | Yes | | | | |

FIG. 19

Threat countermeasure list (a)

| Threat | Attribute | Countermeasure | | | | | |
|---|---|---|---|---|---|---|---|
| | | Technique (Security function) | Resource | Version | Effect threat level | Application | Effect threat level |
| DoS attack | Function | Filtering | 10 | 1.0 | 2 | Redundant system—stop | 3 |
| DoS attack | Function | IDS-isolation | 50 | 1.2 | 1 | Redundant system—stop | 3 |
| Identity theft | Information | Device, user authentication | 10 | 1.0 | 3 | Accessible member only | 3 |
| Identity theft | Information | Two-factor authentication | 30 | 1.1 | 2 | Accessible member only | 3 |
| Eavesdropping | Information | Encryption | 20 | 1.0 | 2 | Blocking wired communication /port | 2 |
| Tampering | Information | Message authentication | 30 | 1.2 | 2 | Accessible member only | 2 |
| Reverse engineering | Information | Anti-tamper device | 50 | 1.3 | 1 | Locking management of device | 2 |

Countermeasure requirement risk level 15 or higher
Device version = 1.0
Resource = 50

Countermeasure scenario (c)

| Protected asset (importance level) | Threat (threat level) | Risk value | Countermeasure required | Countermeasure | Resource | Effect value | Post-countermeasure risk value |
|---|---|---|---|---|---|---|---|
| Device function (5) | DoS attack (5) | 25 | Yes | Filtering | 10 | 2 | 10 |
| User program (4) | Eavesdropping (5) | 20 | Yes | Encryption | 20 | 2 | 8 |
| User program (4) | Tampering (3) | 12 | No | | | | |
| Device function (5) | Identity theft (2) | 10 | No | | | | |
| User program (4) | Reverse engineering (2) | 8 | No | | | | |

FIG. 20

Threat countermeasure list (a)

| Threat | Attribute | Countermeasure | | | | | |
|---|---|---|---|---|---|---|---|
| | | Technique (Security function) | Resource | Version | Effect threat level | Application | Effect threat level |
| DoS attack | Function | Filtering | 10 | 1.0 | 2 | Redundant system—stop | 3 |
| DoS attack | Function | IDS-isolation | 50 | 1.2 | 1 | Redundant system—stop | 3 |
| Identity theft | Information | Device, user authentication | 10 | 1.0 | 3 | Accessible member only | 3 |
| Identity theft | Information | Two-factor authentication | 30 | 1.1 | 2 | Accessible member only | 3 |
| Eavesdropping | Information | Encryption | 20 | 1.0 | 2 | Blocking wired communication /port | 2 |
| Tampering | Information | Message authentication | 30 | 1.2 | 2 | Accessible member only | 2 |
| Reverse engineering | Information | Anti-tamper device | 50 | 1.3 | 1 | Locking management of device | 2 |

Countermeasure requirement risk level 15 or higher
Device version = 1.2
Resource = 100

Countermeasure scenario (d)

| Protected asset (Importance level) | Threat (threat level) | Risk value | Countermeasure required | Countermeasure | Resource | Effect value | Post-countermeasure risk value |
|---|---|---|---|---|---|---|---|
| Device function (5) | DoS attack (5) | 25 | Yes | IDS-isolation | 50 | 1 | 5 |
| User program (4) | Eavesdropping (5) | 20 | Yes | Encryption | 20 | 2 | 8 |
| User program (4) | Tampering (3) | 12 | No | | | | |
| Device function (5) | Identity theft (2) | 10 | No | | | | |
| User program (4) | Reverse engineering (2) | 8 | No | | | | |

FIG. 21

Threat countermeasure list (a)

| Threat | Attribute | Countermeasure | | | | | |
|---|---|---|---|---|---|---|---|
| | | Technique (Security function) | Resource | Version | Effect threat level | Application | Effect threat level |
| DoS attack | Function | Filtering | 10 | 1.0 | 2 | Redundant system—stop | 3 |
| DoS attack | Function | IDS-isolation | 50 | 1.2 | 1 | Redundant system—stop | 3 |
| Identity theft | Information | Device, user authentication | 10 | 1.0 | 3 | Accessible member only | 3 |
| Identity theft | Information | Two-factor authentication | 30 | 1.1 | 2 | Accessible member only | 3 |
| Eavesdropping | Information | Encryption | 20 | 1.0 | 2 | Blocking wired communication /port | 2 |
| Tampering | Information | Message authentication | 30 | 1.2 | 2 | Accessible member only | 2 |
| Reverse engineering | Information | Anti-tamper device | 50 | 1.3 | 1 | Locking management of device | 2 |

Countermeasure requirement risk level 15 or higher
Device version = 1.2
Resource = 20

Countermeasure scenario (e)

| Protected asset (importance level) | Threat (threat level) | Risk value | Countermeasure required | Countermeasure | Resource | Effect value | Post-countermeasure risk value |
|---|---|---|---|---|---|---|---|
| Device function (5) | DoS attack (5) | 25 | Yes | Filtering | 10 | 1 | 5 |
| User program (4) | Eavesdropping (5) | 20 | Yes | Blocking wired communication/port | 0 | 2 | 0 |
| User program (4) | Tampering (3) | 12 | No | | | | |
| Device function (5) | Identity theft (2) | 10 | No | | | | |
| User program (4) | Reverse engineering (2) | 8 | No | | | | |

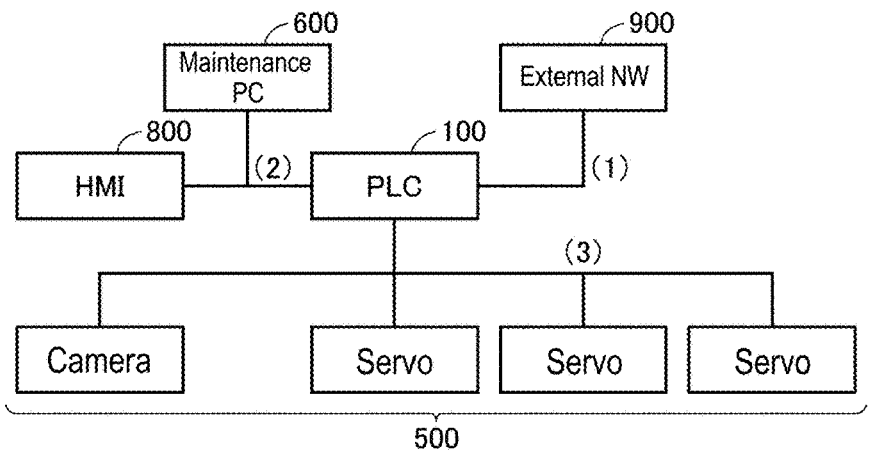

(b)

| Protected asset (importance level) | Attack port | Threat (threat level) | Risk value |
|---|---|---|---|
| Device function (5) | (1) | DoS attack (5) | 25 |
| Device function (5) | (1) | Identity theft (2) | 10 |
| User program (4) | (2) | Eavesdropping (5) | 20 |
| User program (4) | (2) | Tampering (3) | 12 |
| User program (4) | (2) | Reverse engineering (2) | 8 |

(c)

| Protected asset (importance level) | Threat (threat level) | Risk value | Countermeasure required | Countermeasure | Resource | Effect value | Post-countermeasure risk value |
|---|---|---|---|---|---|---|---|
| Device function (5) | DoS attack (5) | 25 | Yes | IDS-isolation | 10 | 1 | 5 |
| User program (4) | Eavesdropping (5) | 20 | Yes | Blocking wired communication/port | 0 | 2 | 6 |
| User program (4) | Tampering (3) | 12 | No | | | | |
| Device function (5) | Identity theft (2) | 10 | No | | | | |
| User program (4) | Reverse engineering (2) | 8 | No | | | | |

| Protected asset (importance level) | Threat (threat level) | Risk value | Countermeasure required | Countermeasure | Resource | Effect value | Post-countermeasure risk value | Security function |
|---|---|---|---|---|---|---|---|---|
| Device function (5) | DoS attack (5) | 25 | Yes | IDS-isolation | 10 | 1 | 5 | IDS |
| User program (4) | Eavesdropping (5) | 20 | Yes | Blocking wired communication/port | 0 | 2 | 8 | - |
| User program (4) | Tampering (3) | 12 | No | | | | | |
| Device function (5) | Identity theft (2) | 10 | No | | | | | |
| User program (4) | Reverse engineering (2) | 8 | No | | | | | |

(b)

| Operation countermeasure | Content | Countermeasure spot |
|---|---|---|
| Self-diagnosis test | Regularly executing tampering check | PLC |
| Blocking wired communication/port | Performing locking so that communication port cannot be connected | PLC |
| Locking management | PLC equipment/locking of device | PLC |

FIG. 24

Protected asset evaluation list display

Please add list or edit importance level (1-5) as necessary

| Half-protected asset | Attribute | Importance level |
|---|---|---|
| Device status display function | Function | 4 |
| Device operation status data | Information | 4 |

| Protected asset | Attribute | Importance level |
|---|---|---|
| Device control | Function | 5 |
| User program | Information | 5 |
| Control information | Information | 3 |
| System configuration information | Information | 2 |
| Component setting | Information | 2 |
| Operation history | Information | 1 |

| Protected asset | Attribute | Importance level |
|---|---|---|
| Camera function | Function | 3 |
| Camera screen | Information | 3 |

| Protected asset | Attribute | Importance level |
|---|---|---|
| Servo function | Function | 3 |
| Control instruction data | Information | 3 |

Is the content acceptable? [Return] [Next]

FIG. 26

Threat scenario list

Please add list or edit threat level (1-5) as necessary

| | | | |
|---|---|---|---|
| External NW | Communication DoS attack (Ether/IP) | Function | 3 |
| | Communication data eavesdropping | Information | 4 |
| | Communication data tampering | Information | 2 |
| Unauthorized component connection | Communication DoS attack (Ether/IP) | Function | 2 |
| | Communication data eavesdropping | Information | 2 |
| | Communication data tampering | Information | 2 |

| | | | |
|---|---|---|---|
| Memory card | Firmware tampering | Information | 4 |
| | User program theft | Information | 4 |
| Maintenance PC | Malware caused malfunction | Function | 4 |
| | Data theft | Information | 4 |
| | Communication data tampering | Information | 3 |

| | | | |
|---|---|---|---|
| Camera | Camera hijacking | Function | 3 |
| | Screen tampering | Information | 1 |
| Servo | Servo function stop | Function | 3 |
| | Servo control data tampering | Information | 2 |

Is the content acceptable?  Return  Next

Selection of risk value estimation method

Please select risk value estimation method

- ● Importance x threat level — [Set weight]
- ○ CVSS — [Set parameter]
- ○ RSMA — [Set parameter]

Is the content acceptable? [Return] [Next]

(b)

Weight setting

Please set weight

Importance: [ 1 ]

Threat level: [ 1 ]

Is the content acceptable? [Return] [Next]

FIG. 28

| Threat scenario list | | | |
|---|---|---|---|
| Please confirm threat scenario list.<br>Please input risk value for countermeasure necessity determination<br>to set whether countermeasure is required. | | | |
| | | Countermeasure requirement risk level | 15 or higher |
| Process asset (importance level) | Threat (threat level) | Risk value | Countermeasure required |
| Device function (5) | DoS attack (5) | 25 | Yes |
| User program (4) | Eavesdropping (5) | 20 | Yes |
| User program (4) | Tampering (3) | 12 | No |
| Device function (5) | Identity theft (2) | 10 | No |
| User program (4) | Reverse engineering (2) | 8 | No |
| ..... | | | |
| | Is the content acceptable? | Return | Next |

FIG. 29

Selection of unit information and countermeasure policy

Please confirm information of connected unit.

| | |
|---|---|
| Unit number | XX-XX-XX-XX |
| Software version | 1.0 |
| Hardware version | 1.0 |
| Free ROM capacity | 1M |

Please select countermeasure policy.

- ● Default (MAX) setting
- ○ Selection setting
- ○ Authentication correspondence setting Is the content acceptable?   [Return]   [Next]

FIG. 30

Threat countermeasure list

Threat countermeasure list is as follows. Please confirm.
•Countermeasure technique, resource, version, effect threat level
•Operation, effect threat level
Please modify if modification to the above is necessary.

| | | | | | | | |
|---|---|---|---|---|---|---|---|
| DoS attack | Function | Filtering | 10 | 1.0 | 2 | Redundant system—stop | 3 |
| DoS attack | Function | IDS-isolation | 50 | 1.2 | 1 | Redundant system—stop | 3 |
| Identity theft | Information | Device, user authentication | 10 | 1.0 | 2 | Accessible member only | 3 |
| Identity theft | Information | Two-factor authentication | 30 | 1.1 | 2 | Accessible member only | 3 |
| Eavesdropping | Information | Encryption | 20 | 1.0 | 2 | Blocking wired communication/port | 2 |
| Tampering | Information | Message authentication | 30 | 1.2 | 2 | Accessible member only | 2 |
| Reverse engineering | Information | Anti-tamper device | 50 | 1.3 | 1 | Locking management of device | 2 |

Is the content acceptable?  [Return]  [Next]

FIG. 31

Countermeasure scenario

Countermeasure has been set. Please confirm.

Countermeasure policy: Default (MAX) setting

| | | | | | | | |
|---|---|---|---|---|---|---|---|
| Device function (5) | DoS attack (5) | 25 | Yes | IDS-isolation | 50 | 1 | 5 |
| User program (4) | Eavesdropping (5) | 20 | Yes | Encryption | 20 | 2 | 8 |
| User program (4) | Tampering (3) | 12 | Yes | Message authentication | 30 | 2 | 8 |
| Device function (5) | Identity theft (2) | 10 | Yes | Device, user authentication | 10 | 2 | 10 |
| User program (4) | Reverse engineering (2) | 8 | Yes | | | | |

Is the content acceptable?  [Return] [Next]

FIG. 32

CONTROL SYSTEM AND SETTING METHOD

CROSS-REFERENCE TO RELATED APPLICATION

This application is a 371 application of the International PCT application serial no. PCT/JP2020/006824, filed on Feb. 20, 2020, which claims the priority benefits of Japan Patent Application No. 2019-066006, filed on Mar. 29, 2019. The entirety of each of the above-mentioned patent applications is hereby incorporated by reference herein and made a part of this specification.

BACKGROUND

Technical Field

The disclosure relates to a security function and a setting method for a control system including a controller system controlling a control target.

Description of Related Art

In recent years, damage such as malware has occurred at manufacturing sites such as factories, and security countermeasures have become indispensable for control devices such as a programmable logic controller (PLC). Therefore, when developing equipment and production lines of factories or the like, it is necessary for production engineers, equipment manufacturer developers, and the like to take security countermeasures.

In a PLC, for example, as disclosed in Japanese Patent Application Laid-Open No. 2000-137506 (Patent Document 1), when an anomaly history is registered or when a predetermined time has come, only e-mails are sent to pre-specified destinations and no consideration is given to security countermeasures.

RELATED ART

Patent Document(s)

[Patent Document 1] Japanese Patent Application Laid-Open No. 2000-137506

SUMMARY

Problems to be Solved

In particular, with the recent progress in information and communication technology (ICT), the control device is also connected to various external devices via a network, and the processing executed by the control device is also becoming more sophisticated. With such networking or improved intelligence, the types of security threats that can be assumed are also increasing.

However, threat analysis, which analyzes assumed security threats, requires specialized knowledge, and requires a long education time for production engineers and equipment manufacturer developers to acquire knowledge for performing threat analysis. In addition, when a specialist is hired for security threat analysis, the labor cost of the specialist becomes a cost burden for the factory and the equipment manufacturer.

One of the objectives of the disclosure is to solve the new issue of analyzing possible security threats associated with networking or improved intelligence of a control device and a control system and taking countermeasures against the threats.

Means for Solving the Problems

According to an aspect of the disclosure, a control system includes a controller system and a support device. The controller system controls a control target. The support device supports setting of the controller system. The controller system includes a control unit and a security unit. The control unit executes control calculation for controlling the control target. The security unit is connected to the control unit and is responsible for a security function for the controller system. The support device includes a system-configuration input part, a threat analysis database, a threat-scenario creating part, a countermeasure database, a countermeasure creating part, and a security setting part. The system-configuration input part acquires a device configuration and protected assets from the controller system. The threat analysis database stores in advance an importance level for the protected assets of the controller system and a threat level for security threats. The threat-scenario creating part creates a threat scenario from the importance level and the threat level of the threat analysis database according to the device configuration and the protected assets acquired by the system-configuration input part. The countermeasure database stores in advance countermeasures corresponding to the security threats. The countermeasure creating part creates a countermeasure scenario containing a countermeasure for each of the protected assets of the controller system according to the threat scenario created by the threat-scenario creating part and the countermeasures of the countermeasure database. The security setting part outputs a setting data of the security function to the security unit according to the countermeasure scenario created by the countermeasure creating part.

According to this aspect, the control system can analyze security threats by the support device and easily take countermeasures against the threats.

Preferably, the support device may further include a countermeasure result output part that outputs a countermeasure report containing information of at least one of the threat scenario and the countermeasure scenario. According to this aspect, countermeasures against the security threats can be outputted.

Preferably, in the threat analysis database, the threat level for the security threats may differ depending on a device type of the controller system. According to this aspect, countermeasures against the threats can be appropriately taken according to the purpose and important items of the device type of the controller system.

Preferably, the threat scenario may contain a risk value estimated by a predetermined method for each of the protected assets of the controller system and the security threats. According to this aspect, by containing a value estimated by a predetermined method as a risk value, the security threats can be appropriately analyzed.

Preferably, the countermeasure creating part may create the countermeasure scenario for each of the protected assets of the controller system and the security threats of which the risk value contained in the threat scenario is equal to or higher than a predetermined value. According to this aspect, it is possible to take security countermeasures of a countermeasure requirement risk level required by the user.

Preferably, the countermeasure database may store a countermeasure that is based on the security function of the security unit and a countermeasure that is based on an operation not using the security function respectively as the countermeasures corresponding to the security threats. According to this aspect, various security countermeasures can be taken according to the controller system.

Preferably, the countermeasure creating part may create the countermeasure scenario by selecting a countermeasure that is based on the security function of the security unit according to a resource of the security unit. According to this aspect, security countermeasures can be taken according to the resource capacity of the security unit.

Preferably, the countermeasure selected by the countermeasure creating part may differ depending on software and hardware versions of each of devices constituting the controller system. According to this aspect, countermeasures against the threats can be appropriately taken according to the devices constituting the controller system.

Preferably, the countermeasure creating part may select the countermeasure that is based on the operation to create the countermeasure scenario when a resource of the security unit is insufficient. According to this aspect, security countermeasures can be taken according to the resource capacity of the security unit.

According to another aspect of the disclosure, a setting method of a controller system for setting a setting data of a security function for the controller system is provided. The controller system includes a control unit that executes control calculation for controlling a control target and a security unit connected to the control unit and responsible for the security function for the controller system. The setting method includes the following steps. A device configuration and protected assets are acquired from the controller system. A threat scenario is created from an importance level and a threat level stored in advance in a threat analysis database according to the device configuration and the protected assets that are acquired. A countermeasure scenario containing a countermeasure for each of the protected assets of the controller system is created according to the created threat scenario and countermeasures corresponding to security threats stored in advance in a countermeasure database. The setting data of the security function is outputted to the security unit according to the created countermeasure scenario.

According to this aspect, in the control system, it is possible to analyze security threats by the support device and easily set countermeasures against the threats.

Effects

According to the disclosure, it is possible to solve the new issue of analyzing possible security threats associated with networking or improved intelligence of a control device and a control system and taking countermeasures against the threats.

BRIEF DESCRIPTION OF THE DRAWINGS

FIG. 10 is a schematic view showing an example of a device configuration for performing threat analysis and security setting by the support device according to this embodiment.

FIG. 12 is a view showing an example of a protected asset evaluation list created by the support device according to this embodiment.

FIG. 13 is a view showing another example of the protected asset evaluation list created by the support device according to this embodiment.

FIG. 15 is a view showing an example of a threat list created by the support device according to this embodiment.

FIG. 16 is a view showing another example of the threat list created by the support device according to this embodiment.

FIG. 17 is a view showing a modified example of the threat list created by the support device according to this embodiment.

FIG. 18 is a view showing an example of a threat scenario list created by the support device according to this embodiment.

FIG. 19 is a view showing an example of a countermeasure scenario created by the support device according to this embodiment.

FIG. 20 is a view showing an example of a countermeasure scenario created by the support device according to this embodiment when the resource capacity is 50.

FIG. 21 is a view showing an example of a countermeasure scenario created by the support device according to this embodiment when the resource capacity is 100.

FIG. 22 is a view showing an example of a countermeasure scenario created by the support device according to this embodiment when the resource capacity is 20.

FIG. 23 is a view showing an example of a threat analysis result report created by the support device according to this embodiment.

FIG. 24 is a view showing another example of the threat analysis result report created by the support device according to this embodiment.

FIG. 26 is a view showing an example of a protected asset evaluation list displayed by the support device according to this embodiment.

FIG. 27 is a view showing an example of a threat list displayed by the support device according to this embodiment.

FIG. 28 is a view showing an example of setting of a risk value estimation method displayed by the support device according to this embodiment.

FIG. 29 is a view showing an example of a threat scenario list displayed by the support device according to this embodiment.

FIG. 30 is a view showing an example of selection of a countermeasure policy displayed by the support device according to this embodiment.

FIG. 31 is a view showing an example of a threat countermeasure list displayed by the support device according to this embodiment.

FIG. 32 is a view showing an example of a countermeasure scenario displayed by the support device according to this embodiment.

DESCRIPTION OF THE EMBODIMENTS

Figure 1:
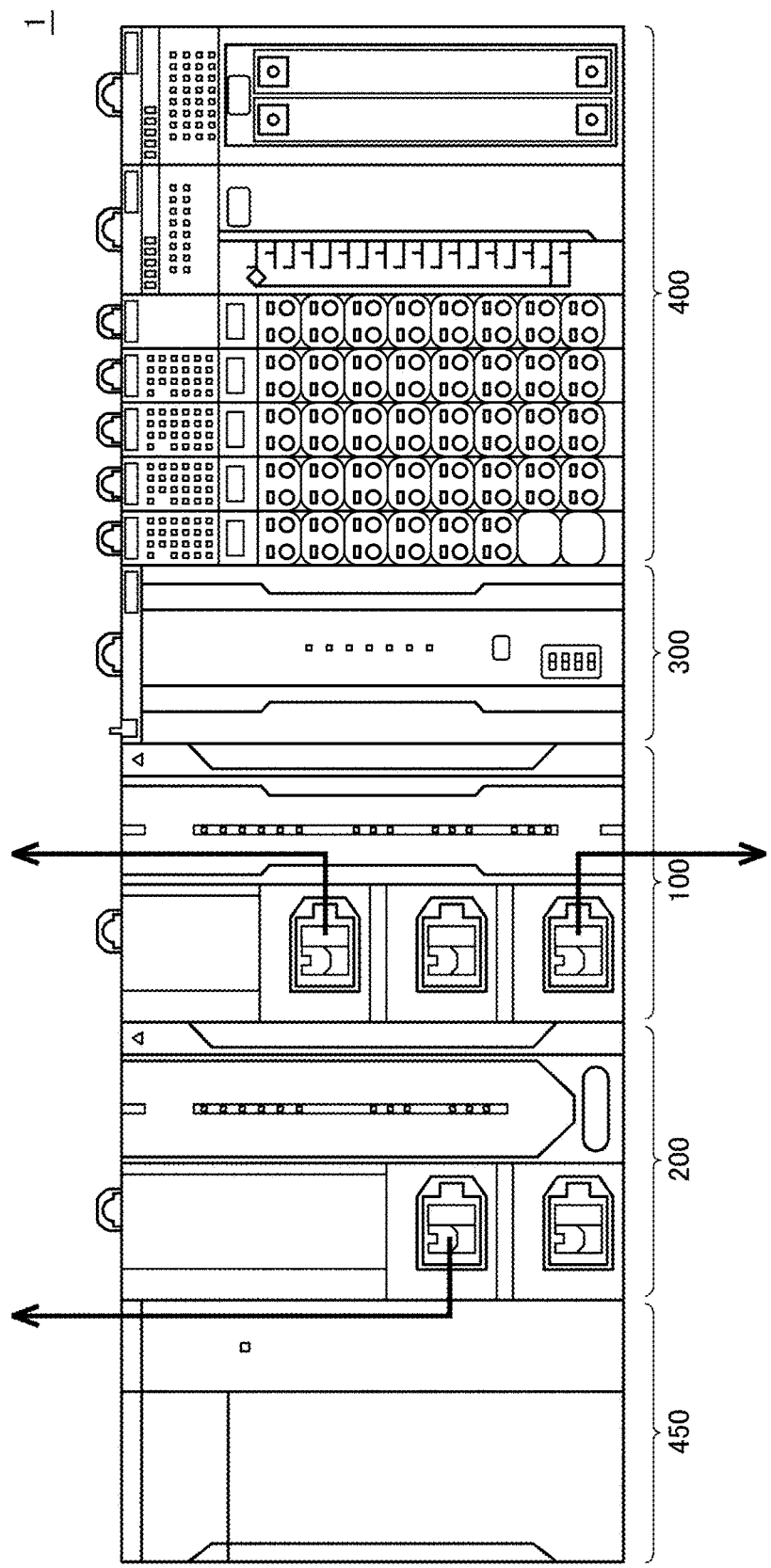
FIG. 1 is an appearance view showing a configuration example of a controller system according to this embodiment.

Embodiments of the disclosure will be described with reference to the drawings. The same or similar parts in the drawings will be labeled with the same reference numeral, and descriptions thereof will not be repeated.

A. APPLICATION EXAMPLE

An example of a situation to which the disclosure is applicable will be described. First, a configuration of a controller system 1 according to this embodiment will be described.

FIG. 1 is an appearance view showing a configuration example of the controller system 1 according to this embodiment. Referring to FIG. 1, the controller system 1 includes a control unit 100, a security unit 200, a safety unit 300, one or a plurality of functional units 400, and a power unit 450.

The control unit 100 and the security unit 200 are connected to each other via any data transmission path (e.g., PCI Express or Ethernet (registered trademark)). The control unit 100, the safety unit 300, and the one or plurality of functional units 400 are connected to each other via an internal bus (not shown).

The control unit 100 executes principal processes in the controller system 1. The control unit 100 executes control calculation for controlling a control target according to request specifications that have been arbitrarily designed. The control calculation executed by the control unit 100 will also be referred to as "standard control" as compared to control calculation executed by the safety unit 300 to be described later. In the configuration example shown in FIG. 1, the control unit 100 has one or a plurality of communication ports.

The security unit 200 is connected to the control unit 100 and is responsible for security functions for the controller system 1. In the configuration example shown in FIG. 1, the security unit 200 has one or a plurality of communication ports. Details of the security functions provided by the security unit 200 will be described later.

The safety unit 300 executes control calculation for realizing safety functions related to a control target independently from the control unit 100. The control calculation executed by the safety unit 300 will also be referred to as "safety control". Typically, the "safety control" is designed to satisfy requirements for realizing safety functions specified in IEC 61508. "Safety control" is a general term for processes for preventing human safety from being threatened by facilities, machines, or the like.

The functional unit 400 provides various functions for realizing control for various control targets of the controller system 1. The functional unit 400 may typically include an I/O unit, a safety I/O unit, a communication unit, a motion controller unit, a temperature adjustment unit, a pulse counter unit, and the like. The I/O unit may include, for example, a digital input (DI) unit, a digital output (DO) unit, an analog input (AI) unit, an analog output (AO) unit, a pulse catch input unit, and a complex unit in which plural types of units are combined with each other. The safety I/O unit is responsible for I/O processes related to the safety control.

The power unit 450 supplies power at a predetermined voltage to each unit configuring the controller system 1.

B. HARDWARE CONFIGURATION EXAMPLE OF EACH UNIT

Next, a hardware configuration example of each unit configuring the controller system 1 according to this embodiment will be described.

(b1: Control Unit 100)

Figure 2:
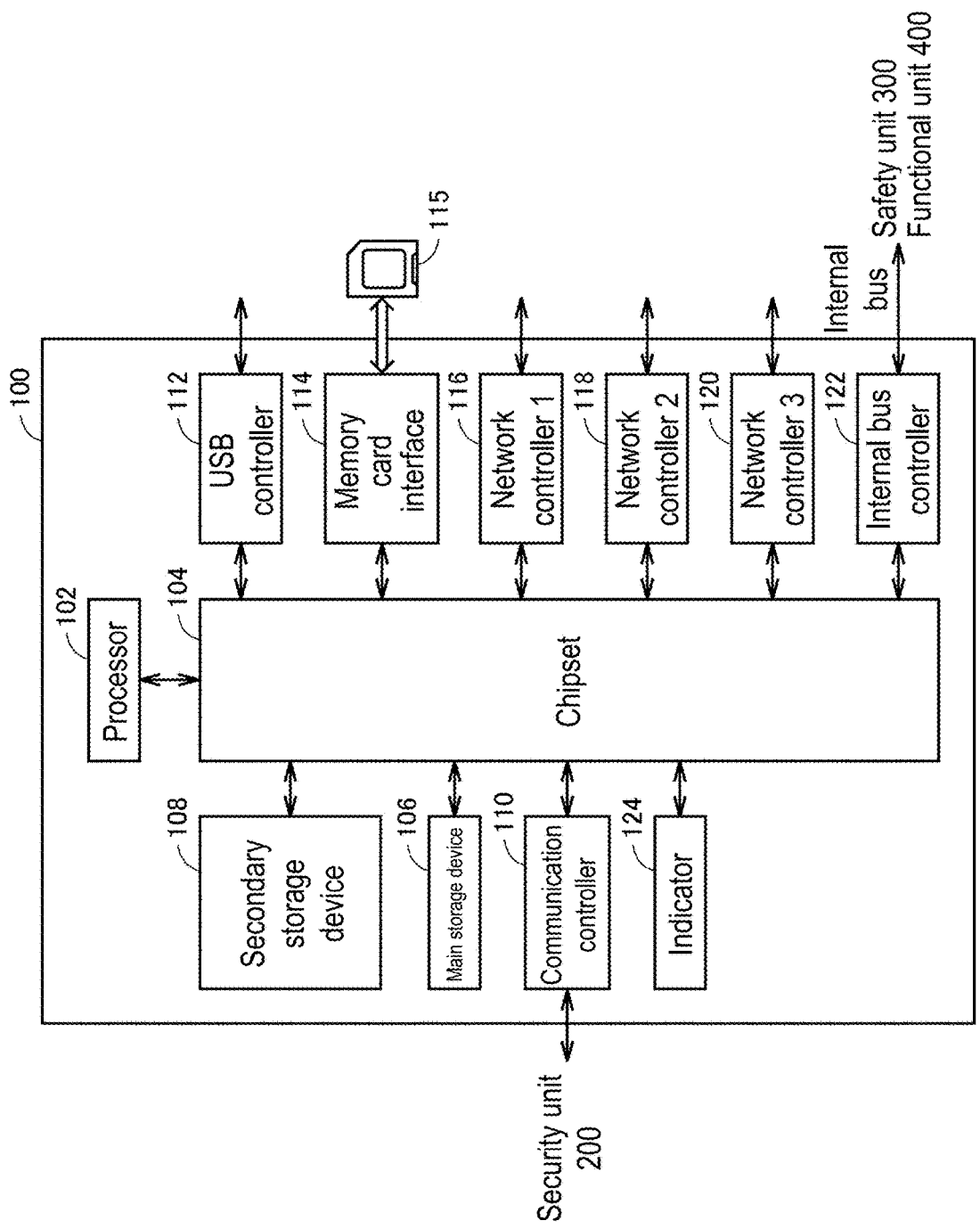
FIG. 2 is a schematic view showing a hardware configuration example of a control unit configuring the controller system according to this embodiment.

FIG. 2 is a schematic view showing a hardware configuration example of the control unit 100 configuring the controller system 1 according to this embodiment. Referring to FIG. 2, the control unit 100 includes, as principal components, a processor 102 such as a central processing unit (CPU) or a graphical processing unit (GPU), a chipset 104, a main storage device 106, a secondary storage device 108, a communication controller 110, a Universal Serial Bus (USB) controller 112, a memory card interface 114, network controllers 116, 118, and 120, an internal bus controller 122, and an indicator 124.

The processor 102 reads various programs stored in the secondary storage device 108, loads the programs to the main storage device 106, and executes the programs to realize control calculation related to the standard control and various processes to be described later. The chipset 104 mediates the exchange of data between the processor 102 and each component to realize the overall process in the control unit 100.

The secondary storage device 108 stores not only a system program but also a control program that operates on an execution environment provided by the system program.

The communication controller 110 is responsible for the exchange of data with the security unit 200. As the communication controller 110, for example, a communication chip supporting PCI Express or Ethernet (registered trademark) may be employed.

The USB controller 112 is responsible for the exchange of data with any information processing device via USB connection.

The memory card interface 114 is configured to be detachably attached with a memory card 115, and can record the control program or data such as various settings to the memory card 115 or read the control program or the data such as various settings from the memory card 115.

Each of the network controllers 116, 118, and 120 is responsible for the exchange of data with any device via a network. The network controllers 116, 118, and 120 may employ an industrial network protocol such as EtherCAT (registered trademark), EtherNet/IP (registered trademark), DeviceNet (registered trademark), or CompoNet (registered trademark).

The internal bus controller 122 is responsible for the exchange of data with the safety unit 300 or the one or plurality of functional units 400 configuring the controller system 1. For the internal bus, a manufacturer-specific communication protocol may be used, or a communication protocol that is the same as or compliant with any industrial network protocol may be used.

The indicator 124 provides notifications of an operation state and the like of the control unit 100, and is configured with one or a plurality of LEDs or the like disposed on a unit surface.

FIG. 2 shows the configuration example in which the necessary functions are provided by the processor 102 executing the programs, but some or all of the provided functions may be implemented by using a dedicated hardware circuit (e.g., an application specific integrated circuit (ASIC) or a field programmable gate array (FPGA)). Alternatively, main parts of the control unit 100 may also be realized by using hardware (e.g., an industrial PC based on a general-purpose PC) conforming to a general-purpose architecture. In this case, a virtualization technique may be used to execute a plurality of operating systems (OSs) having different uses in parallel and also to execute necessary applications on each OS.

(b2: Security Unit 200)

Figure 3:
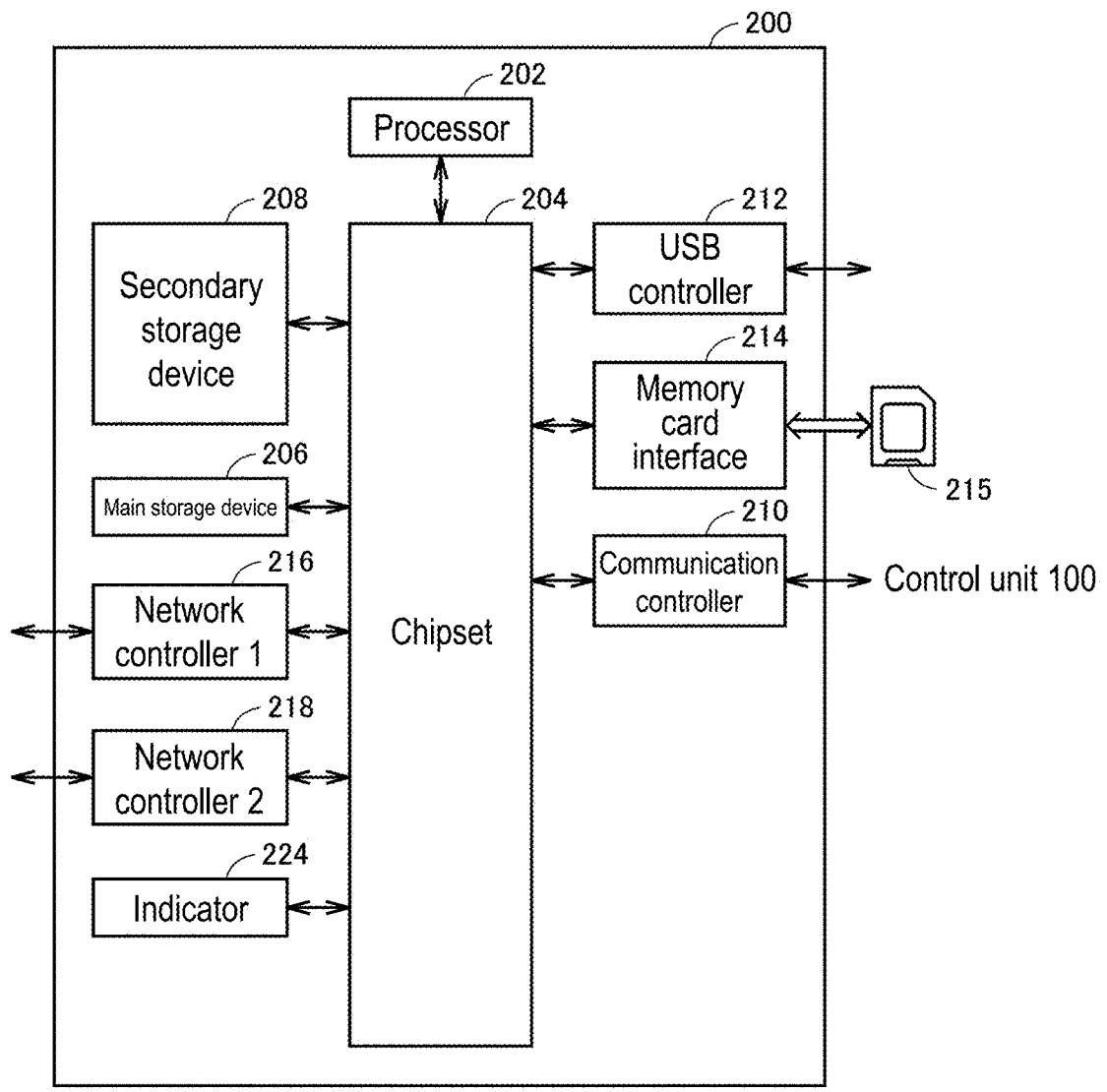
FIG. 3 is a schematic view showing a hardware configuration example of a security unit configuring the controller system according to this embodiment.

FIG. 3 is a schematic view showing a hardware configuration example of the security unit 200 configuring the controller system 1 according to this embodiment. Referring to FIG. 3, the security unit 200 includes, as principal components, a processor 202 such as a CPU or a GPU, a chipset 204, a main storage device 206, a secondary storage device 208, a communication controller 210, a USB controller 212, a memory card interface 214, network controllers 216 and 218, and an indicator 224.

The processor 202 reads various programs stored in the secondary storage device 208, loads the programs to the main storage device 206, and executes the programs to realize various security functions to be described later. The chipset 204 mediates the exchange of data between the processor 202 and each component to realize the overall process in the security unit 200.

The secondary storage device 208 stores not only a system program but also a security system program that operates on an execution environment provided by the system program.

The communication controller 210 is responsible for the exchange of data with the control unit 100. As the communication controller 210, for example, a communication chip compatible with PCI Express or Ethernet (registered trademark) may be employed in the same manner as the communication controller 110 of the control unit 100.

The USB controller 212 is responsible for the exchange of data with any information processing device via USB connection.

The memory card interface 214 is configured to be detachably attached with a memory card 215, and can record a control program or data such as various settings to the memory card 215 or read the control program or the data such as various settings from the memory card 215.

Each of the network controllers 216 and 218 is responsible for the exchange of data with any device via a network. The network controllers 216 and 218 may employ a general-purpose network protocol such as Ethernet (registered trademark).

The indicator 224 provides notifications of an operation state and the like of the security unit 200, and is configured with one or a plurality of LEDs or the like disposed on a unit surface.

FIG. 3 shows the configuration example in which the necessary functions are provided by the processor 202 executing the programs, but some or all of the provided functions may be implemented by using a dedicated hardware circuit (e.g., an ASIC or an FPGA). Alternatively, main parts of the security unit 200 may also be realized by using hardware (e.g., an industrial PC based on a general-purpose PC) conforming to a general-purpose architecture. In this case, a virtualization technique may be used to execute a plurality of OSs having different uses in parallel and also to execute necessary applications on each OS.

(b3: Safety Unit 300)

Figure 4:
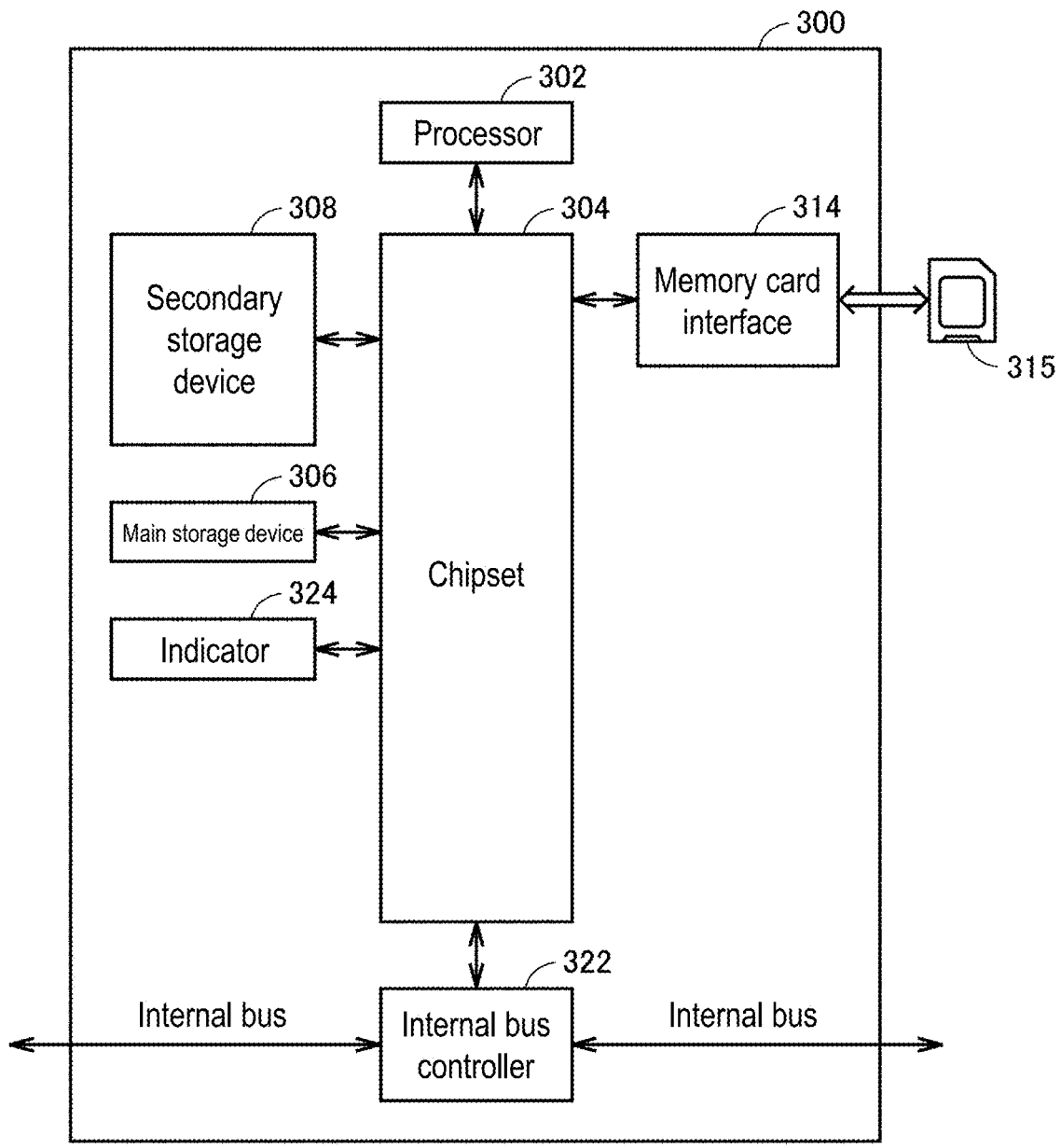
FIG. 4 is a schematic view showing a hardware configuration example of a safety unit configuring the controller system according to this embodiment.

FIG. 4 is a schematic view showing a hardware configuration example of the safety unit 300 configuring the controller system 1 according to this embodiment. Referring to FIG. 4, the safety unit 300 includes, as principal components, a processor 302 such as a CPU or a GPU, a chipset 304, a main storage device 306, a secondary storage device 308, a memory card interface 314, an internal bus controller 322, and an indicator 324.

The processor 302 reads various programs stored in the secondary storage device 308, loads the programs to the main storage device 306, and executes the programs to realize control calculation related to the safety control and various processes to be described later. The chipset 304 mediates the exchange of data between the processor 302 and each component to realize the overall process in the safety unit 300.

The secondary storage device 308 stores not only a system program but also a safety program that operates on an execution environment provided by the system program.

The memory card interface 314 is configured to be detachably attached with a memory card 315, and can record the safety program or data such as various settings to the memory card 315 or read the safety program or the data such as various settings from the memory card 315.

The internal bus controller 322 is responsible for the exchange of data with the control unit 100 via an internal bus.

The indicator 324 provides notifications of an operation state and the like of the safety unit 300, and is configured with one or a plurality of LEDs or the like disposed on a unit surface.

FIG. 4 shows the configuration example in which the necessary functions are provided by the processor 302 executing the programs, but some or all of the provided functions may be implemented by using a dedicated hardware circuit (e.g., an ASIC or an FPGA). Alternatively, main parts of the safety unit 300 may also be realized by using hardware (e.g., an industrial PC based on a general-purpose PC) conforming to a general-purpose architecture. In this case, a virtualization technique may be used to execute a plurality of OSs having different uses in parallel and also to execute necessary applications on each OS.

C: SETTING OF SECURITY FUNCTIONS

Figure 5:
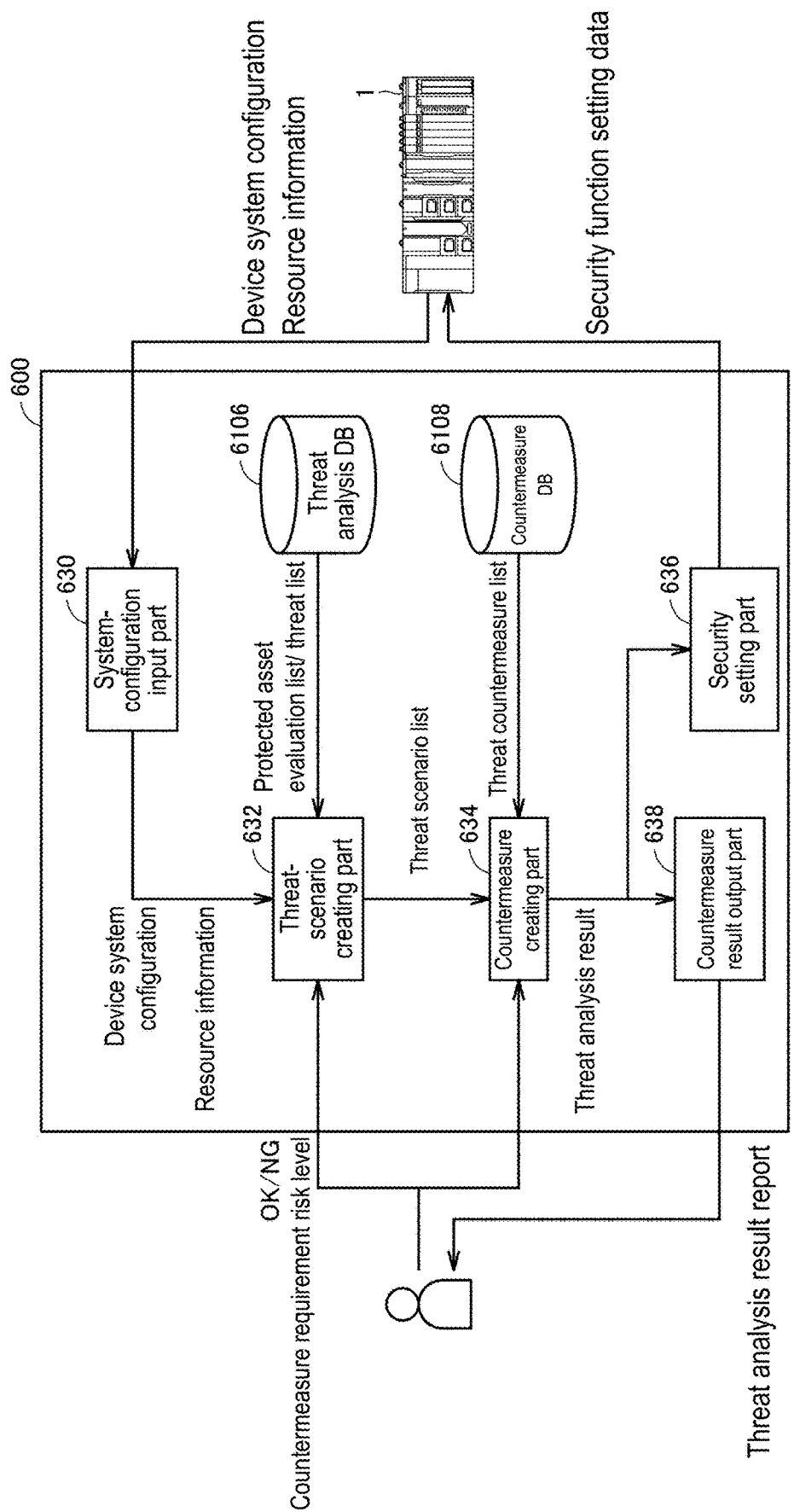
FIG. 5 is a block diagram showing a system configuration for performing security setting by a support device connected to the controller system according to this embodiment.

Next, an example of processing when performing setting for realizing various security functions in the above security unit 200 will be described. FIG. 5 is a block diagram showing a system configuration for performing security setting by a support device connected to a controller system according to this embodiment. As shown in FIG. 5, a support device 600 includes a system-configuration input part 630, a threat-scenario creating part 632, a countermeasure creating part 634, and a security setting part 636. The support device 600 further includes a threat analysis database 6106 and a countermeasure database 6108. However, it is also possible that the threat analysis database 6106 and the countermeasure database 6108 are not provided in the support device 600 but are provided in an external server.

First, the support device 600 acquires device configuration (device system configuration) information and protected asset information (including resource information of the security unit 200) from the controller system 1 by the system-configuration input part 630. According to the device configuration and the protected assets acquired by the system-configuration input part 630, the threat-scenario creating part 632 creates a threat scenario from importance levels and threat levels of the threat analysis database 6106. In this specification, the "importance level" is an index indicating the importance of the protected assets constituting the controller system 1 and may be set by the user. In this specification, the "threat level" is an index indicating a security threat to the controller system 1 and may be set by the user. In this specification, the "protected assets" are devices and the like constituting the controller system 1 and include the control unit 100, the security unit 200, a field device 500, and the like.

The threat analysis database 6106 stores in advance the importance levels for the protected assets of the controller system 1 and the threat levels for the security threats. The user performs a determination of "OK" or "NG" on the threat scenario created by the threat-scenario creating part 632, and inputs the determination result to the threat-scenario creating part 632. In addition, the user may input a countermeasure requirement risk level to the threat-scenario creating part 632.

According to the threat scenario created by the threat-scenario creating part 632 and the countermeasure of the countermeasure database 6108, the countermeasure creating part 634 creates a countermeasure scenario that contains a countermeasure for each of the protected assets of the controller system 1. The countermeasure database 6108 stores in advance countermeasures corresponding to security threats. The user performs a determination of "OK" or "NG" on the countermeasure scenario created by the countermeasure creating part 634 and inputs the determination result to the countermeasure creating part 634.

According to the countermeasure scenario created by the countermeasure creating part 634, the security setting part 636 outputs setting data of security functions (security function setting data) to the security unit 200. The security unit 200 realizes various security functions according to the setting data (security function setting data). A countermeasure result output part 638 outputs a threat analysis result including the countermeasure scenario created by the countermeasure creating part 634 to the user as a threat analysis result report.

Figure 6:
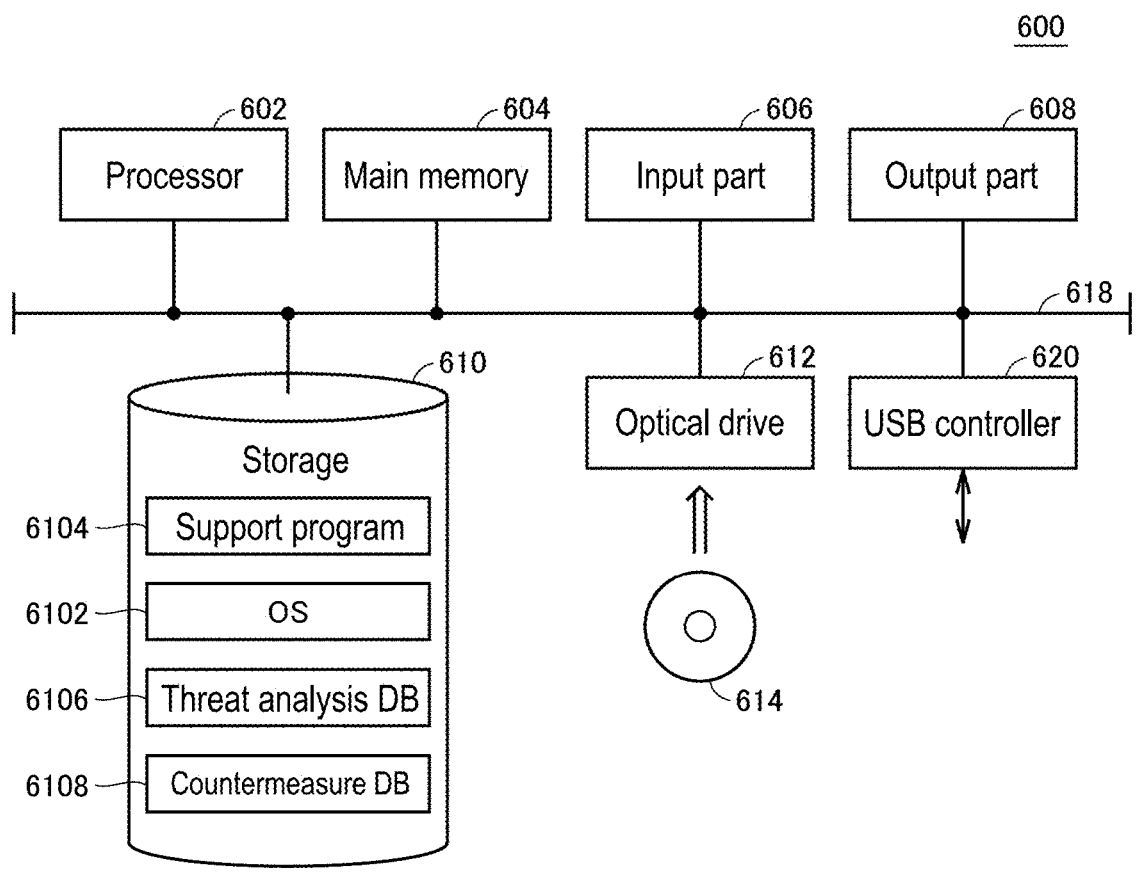
FIG. 6 is a schematic view showing a hardware configuration example of the support device connected to the controller system according to this embodiment.

The configuration described with reference to FIG. 5 is realized by a hardware configuration of the support device 600 described below. FIG. 6 is a schematic view showing a hardware configuration example of the support device 600 connected to the controller system 1 according to this embodiment. As an example, the support device 600 is realized by using hardware (e.g., a general-purpose personal computer) conforming to a general-purpose architecture.

Referring to FIG. 6, the support device 600 includes a processor 602, a main memory 604, an input part 606, an output part 608, a storage 610, an optical drive 612, and a USB controller 620. These components are connected to each other via a processor bus 618.

The processor 602 is configured with a CPU or a GPU, reads programs (e.g., an OS 6102 and a support program 6104) stored in the storage 610, loads the programs to the main memory 604, and executes the programs to perform a setting process or the like on the controller system 1.

The main memory 604 is configured with a volatile storage device such as a DRAM or an SRAM. The storage 610 is configured with a nonvolatile storage device such as an HDD or an SSD.

The storage 610 stores not only the OS 6102 for realizing fundamental functions but also the support program 6104 for providing functions as the support device 600. In other words, the support program 6104 is executed by a computer connected to the controller system 1 to implement the support device 600 according to this embodiment. Further, the storage 610 stores the threat analysis database 6106 and the countermeasure database 6108.

The input part 606 is configured with a keyboard, a mouse, and the like, and receives a user operation. The output part 608 is configured with a display, various indicators, a printer, and the like, and outputs a processing result or the like from the processor 602.

The USB controller 620 exchanges data with the controller system 1 or the like through USB connection.

The support device 600 has the optical drive 612, and a computer-readable program is read from a recording medium 614 (e.g., an optical recording medium such as a digital versatile disc (DVD)) that stores the program in a non-transitory manner and is installed in the storage 610 or the like.

The support program 6104 or the like executed by the support device 600 may be installed via the computer-readable recording medium 614, or may be downloaded from a server device or the like on the network to be installed. The functions provided by the support device 600 according to this embodiment may be realized in a form of using some modules provided by the OS.

FIG. 6 shows the configuration example in which the necessary functions as the support device 600 are provided by the processor 602 executing the programs, but some or all of the provided functions may also be implemented by using a dedicated hardware circuit (e.g., an ASIC or an FPGA).

Figure 7:
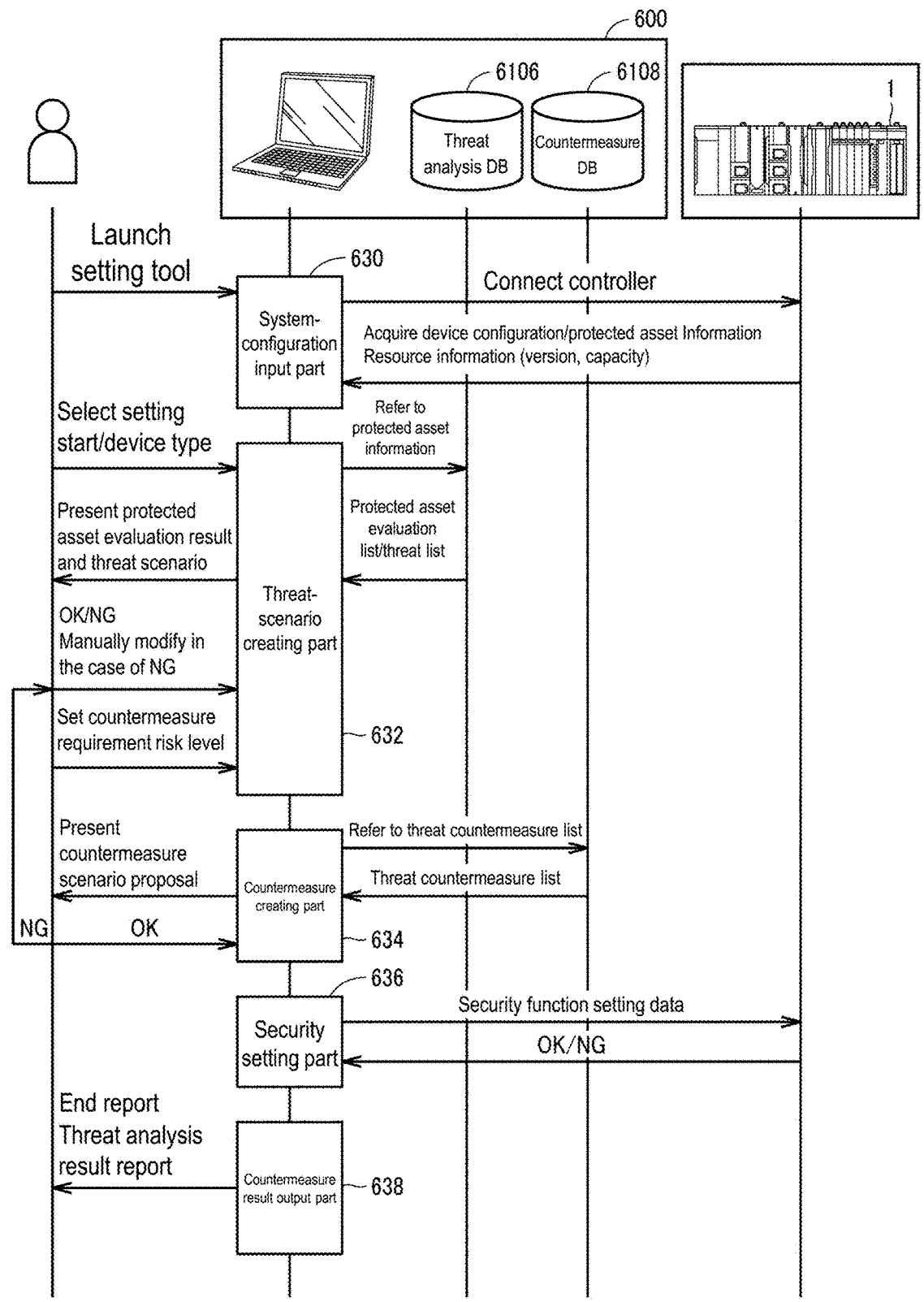
FIG. 7 is a sequence showing threat analysis and security setting in the controller system and the support device according to this embodiment.

Next, the threat analysis and the security setting performed during device development and device launching in the system configuration for performing security setting by the support device 600 will be described in detail. FIG. 7 is a sequence showing the threat analysis and the security setting in the controller system and the support device according to this embodiment. In the sequence shown in FIG. 7, a typical example of a control system including the controller system 1 and the support device 600 will be described.

First, the user launches a setting tool of the security unit 200 by the support device 600. When the setting tool is launched, the system-configuration input part 630 makes an inquiry to the controller system 1. In response to the inquiry from the system-configuration input part 630, the controller system 1 returns the device configuration information and the protected asset information of the controller system 1 to the system-configuration input part 630. The system-configuration input part 630 acquires the device configuration information and the protected asset information from the controller system 1. Further, the system-configuration input part 630 acquires resource information of the security unit

200 such as software and hardware version information and a resource capacity from the security unit 200.

The user selects start of setting of the security unit 200 by the support device 600, and when the device type is selected, the threat-scenario creating part 632 creates a threat scenario list from the importance levels and the threat levels of the threat analysis database 6106 according to the device type. Specifically, the threat-scenario creating part 632 creates a protected asset evaluation list and a threat list by referring to the information of the threat analysis database 6106, and presents to the user a threat scenario list based on the protected asset evaluation list and the threat list. The threat-scenario creating part 632 may also create a threat scenario list from the importance levels and the threat levels of the threat analysis database 6106 regardless of the device type.

The user performs a determination of "OK" or "NG" on the presented threat scenario list and inputs the determination result to the threat-scenario creating part 632. When the threat scenario list is "NG", the user may manually modify it. In addition, the user may input a countermeasure requirement risk level to the threat-scenario creating part 632. In the support device 600, countermeasures corresponding to the security threats may be created according to the countermeasure requirement risk level.

According to the threat scenario list created by the threat-scenario creating part 632 and the countermeasures of the countermeasure database 6108, the countermeasure creating part 634 creates a countermeasure scenario that contains a countermeasure for each of the protected assets of the controller system 1. Referring to a threat countermeasure list stored in the threat analysis database 6106, the countermeasure creating part 634 determines the countermeasure for each threat in the threat scenario list and creates a countermeasure scenario.

The countermeasure creating part 634 presents the created countermeasure scenario to the user. The user performs a determination of "OK" or "NG" on the countermeasure scenario created by the countermeasure creating part 634 and inputs the determination result to the countermeasure creating part 634. When the countermeasure scenario is "NG", the process returns to the threat-scenario creating part 632, and the user may manually modify the threat scenario list.

According to the countermeasure scenario created by the countermeasure creating part 634, the security setting part 636 outputs setting data of security functions (security function setting data) to the security unit 200. The security unit 200 realizes various security functions according to the setting data (security function setting data). When the setting is completed according to the setting data (security function setting data), the security unit 200 returns "OK" information to the security setting part 636, and when the setting is incomplete, the security unit 200 returns "NG" information to the security setting part 636.

The countermeasure result output part 638 outputs a threat analysis result including the countermeasure scenario created by the countermeasure creating part 634 to the user as a threat analysis result report. Accordingly, the control system can analyze security threats with the support device 600 and easily take countermeasures against the threats.

D: CREATION OF THREAT SCENARIO LIST AND COUNTERMEASURE SCENARIO

Figure 8:
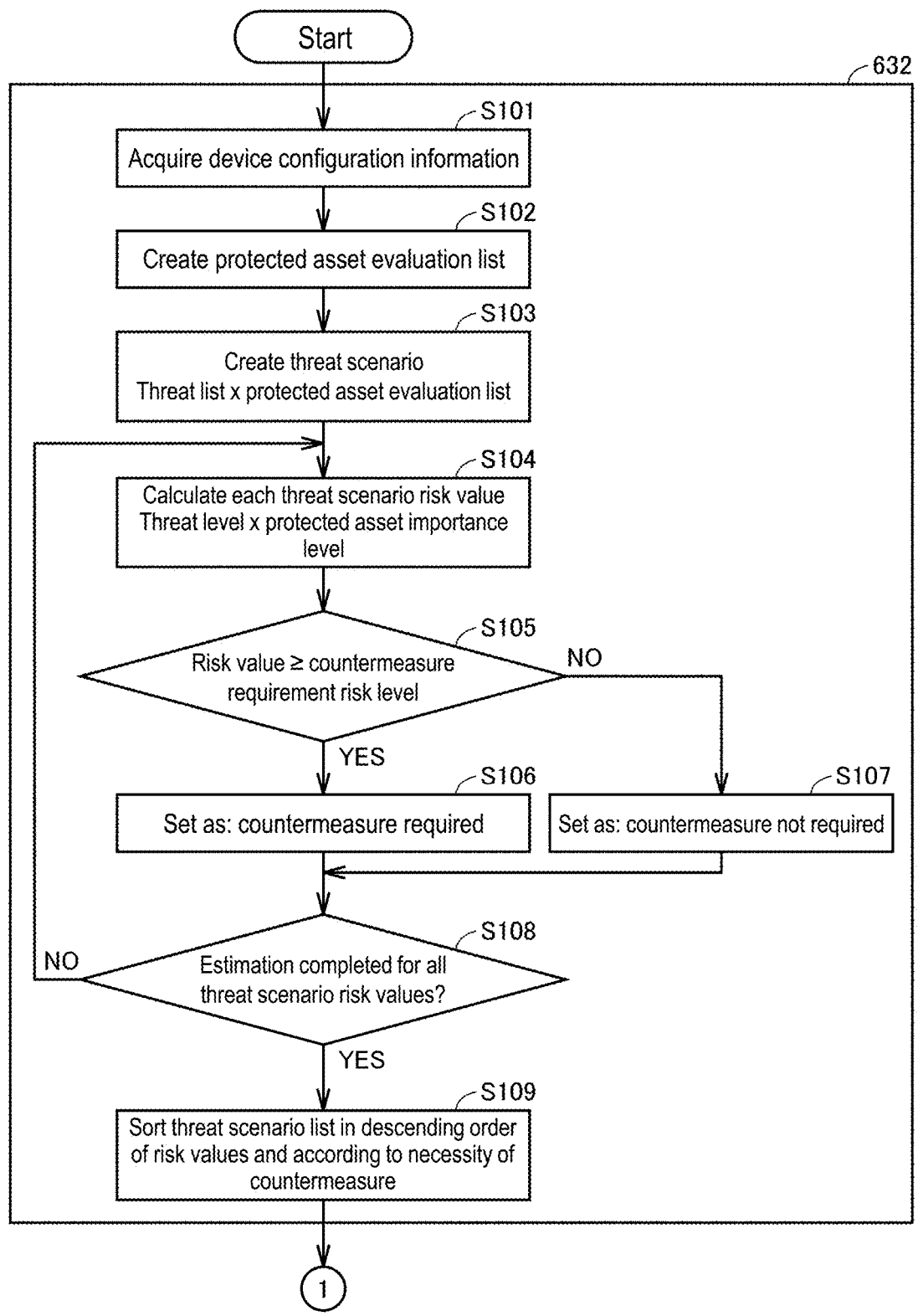
FIG. 8 is a flowchart showing a processing procedure of creating a threat scenario list in the support device according to this embodiment.
Figure 9:
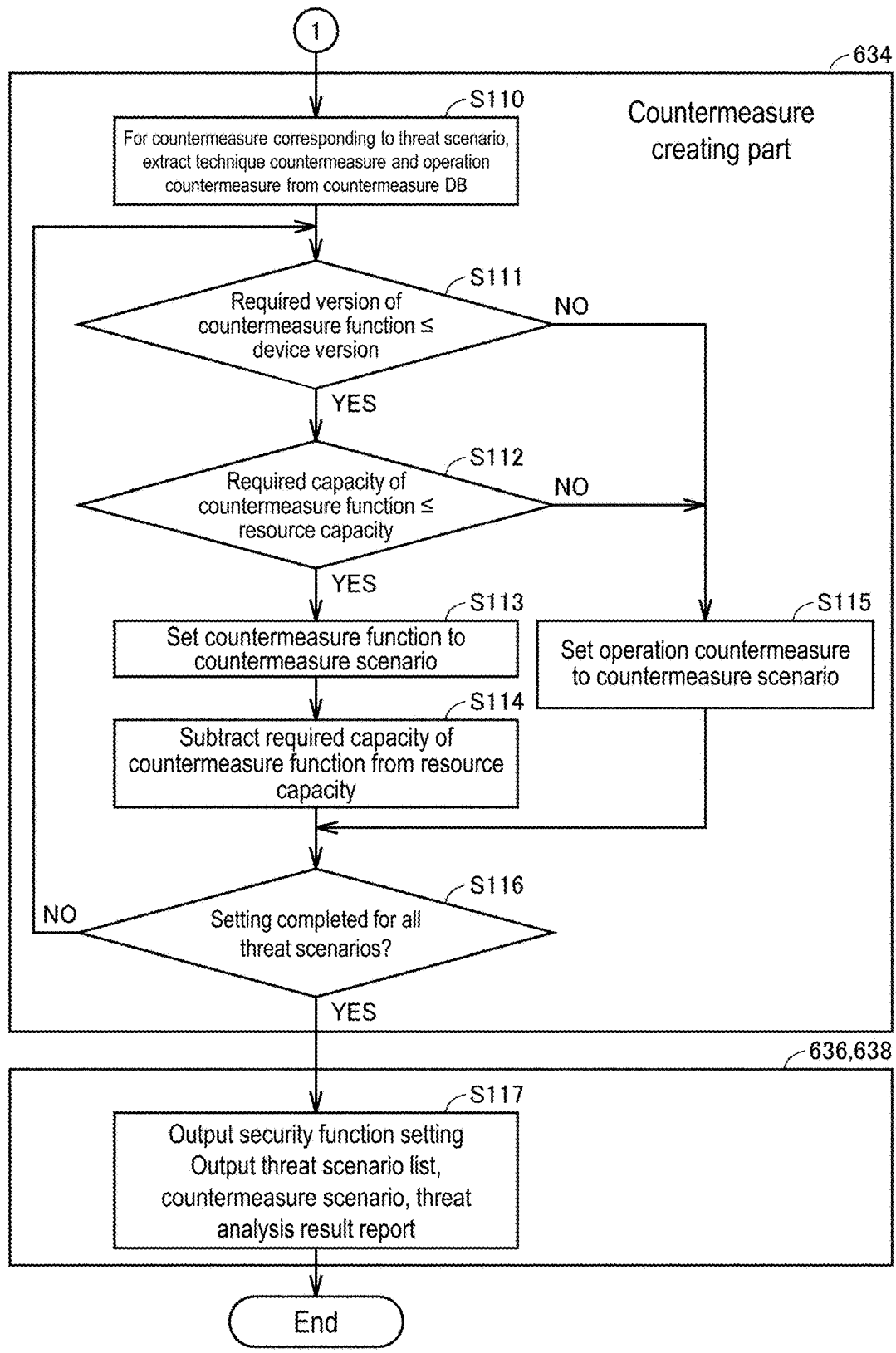
FIG. 9 is a flowchart showing a processing procedure of creating a countermeasure scenario in the support device according to this embodiment.

Next, FIG. 8 is a flowchart showing a processing procedure of creating a threat scenario list in the support device 600 according to this embodiment. Further, FIG. 9 is a flowchart showing a processing procedure of creating a countermeasure scenario in the support device 600 according to this embodiment. First, when the process shown in FIG. 8 is started, the support device 600 acquires device configuration information by the system-configuration input part 630 (step S101). Since the purpose of control and important items differ depending on the type of device controlled by the controller system 1, the security functions to be set also differ.

For example, if the device controlled by the controller system 1 is a semiconductor manufacturing device, since people basically do not enter near the device in the manufacturing process, it is important to maintain control of the device. On the other hand, if the device controlled by the controller system 1 is a press device, since people basically perform operations near the device in the manufacturing process, it is important that the device is reliably stopped in an emergency to protect human safety. Therefore, in the case of a semiconductor manufacturing device, security functions of configurations required to maintain control of the device are preferentially set, and in the case of a press device, security functions of configurations required to reliably stop the device are preferentially set.

FIG. 10 is a schematic view showing an example of a device configuration for performing threat analysis and security setting by the support device according to this embodiment. The device configuration shown in (a) of FIG. 10 is a semiconductor manufacturing device, and the device configuration shown in (b) of FIG. 10 is a press device. In the device configurations shown in (a) and (b) of FIG. 10, the control unit (PLC) 100 and the security unit 200 constitute the controller system 1.

The security unit 200 of the controller system 1 is connected to the network via a communication port (the network controller 216 in FIG. 3) and is connected to the support device (maintenance PC) 600.

The support device 600 has at least access to the control unit 100 and provides the user with functions such as creation of a program to be executed by each unit included in the controller system 1, debugging, setting of various parameters, and setting of various security functions.

The controller system 1 is connected to the network via a communication port (the network controller 116 in FIG. 2) and is connected to a human machine interface (HMI) 800 and an external network (NW) 900.

The HMI 800 presents various information obtained through control calculation in the controller system 1 to an operator, and generates an internal command or the like for the controller system 1 according to an operation from the operator.

The control unit 100 of the controller system 1 is connected to one or a plurality of field devices 500 via a communication port (the network controller 118 in FIG. 2). The field device 500 includes a sensor or a detector that collects various information required for control calculation from a control target, an actuator that applies any action to the control target, and the like.

Returning to FIG. 8, in step S101, the system-configuration input part 630 makes an inquiry to the controller system 1 about the device configuration information and the protected asset information, and acquires the device configuration information and the protected asset information from the controller system 1. Further, based on device type (e.g., a semiconductor manufacturing device, a press device, etc.) information selected by the user, the system-configuration input part 630 creates a device configuration as shown in FIG. 10 from the device configuration information and the protected asset information.

Figure 11:
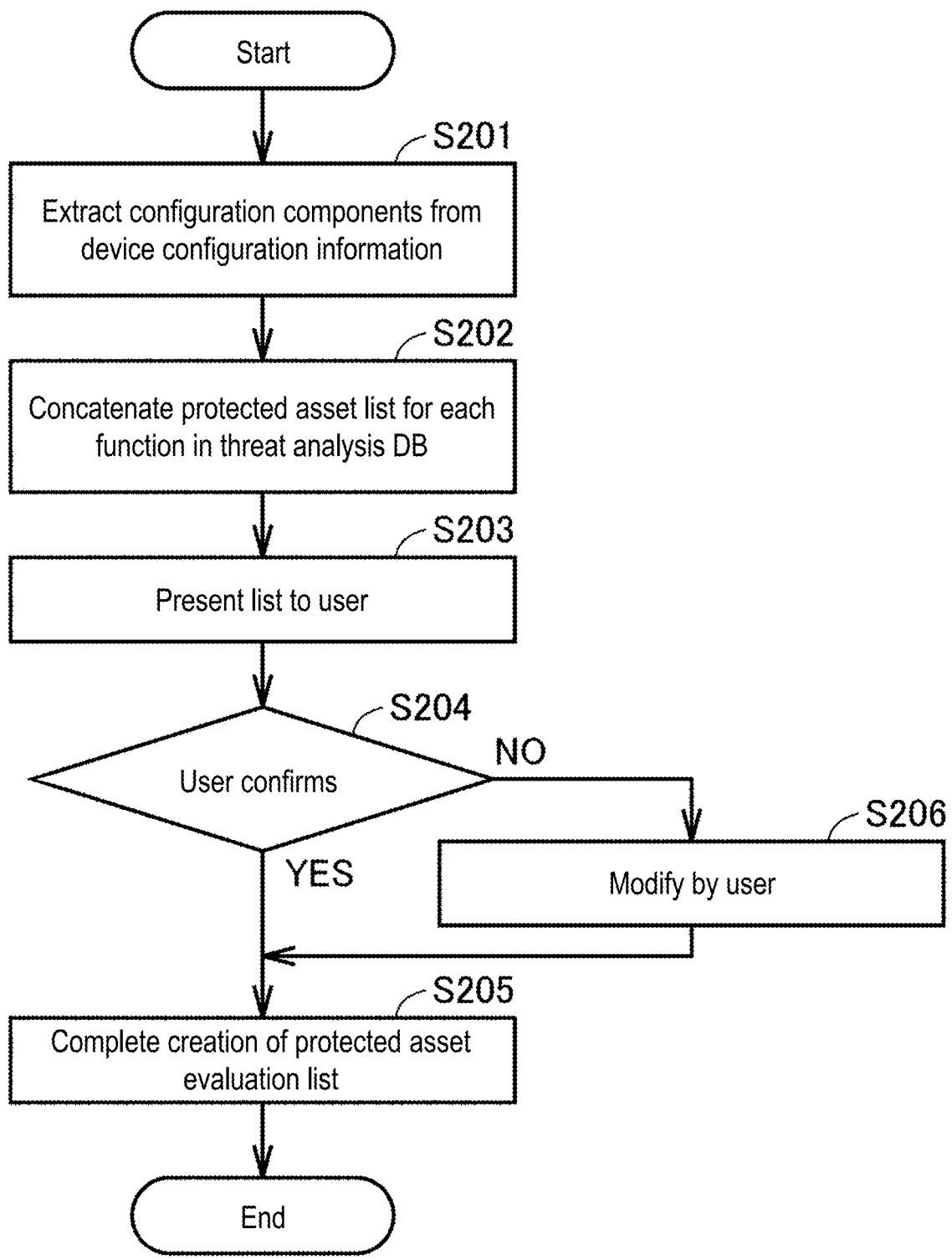
FIG. 11 is a flowchart showing a processing procedure of creating a protected asset evaluation list by the support device according to this embodiment.

Next, according to the device configuration and the protected assets acquired by the system-configuration input part 630, the support device 600 creates a protected asset evaluation list by the threat-scenario creating part 632 (step S102). The creation process of the protected asset evaluation list will be described in more detail. FIG. 11 is a flowchart showing a processing procedure of creating a protected asset evaluation list by the support device according to this embodiment. First, the threat-scenario creating part 632 extracts configuration components from the device configuration information (step S201). The threat-scenario creating part 632 concatenates a protected asset list for each function and each information in the threat analysis database 6106 for the configuration components extracted in step S201 (step S202).

For example, in the case of the semiconductor manufacturing device shown in (a) of FIG. 10, the device configuration includes an HMI, a PLC, a camera, and servos. Therefore, the threat-scenario creating part 632 takes out and concatenates a list of the HMI protected asset, the PLC protected asset, the camera protected asset, and the servo protected asset from the protected asset list in the threat analysis database 6106. FIG. 12 is a view showing an example of a protected asset evaluation list created by the support device according to this embodiment. FIG. 12 shows a protected asset evaluation list (a) in the case of the semiconductor manufacturing device shown in (a) of FIG. 10. The protected asset evaluation list (a) contains the attributes and importance levels of the HMI protected asset, the PLC protected asset, the camera protected asset, and the servo protected asset.

Further, in the case of the press device shown in (b) of FIG. 10, the device configuration includes an HMI, a PLC, and servos. Therefore, the threat-scenario creating part 632 takes out and concatenates a list of the HMI protected asset, the PLC protected asset, and the servo protected asset from the protected asset list in the threat analysis database 6106. FIG. 13 is a view showing another example of the protected asset evaluation list created by the support device according to this embodiment. FIG. 13 shows a protected asset evaluation list (b) in the case of the press device shown in (b) of FIG. 10. The protected asset evaluation list (b) contains the attributes and importance levels of the HMI protected asset, the PLC protected asset, and the servo protected asset.

Since the device configuration differs between the protected asset evaluation list (a) and the protected asset evaluation list (b), the contained protected assets also differ. Further, since the important items differ between the semiconductor manufacturing device and the press device in the protected asset evaluation list (a) and the protected asset evaluation list (b), the importance levels also differ. For example, in the protected asset evaluation list (a), the importance level of the user program of the PLC protected asset is as high as "5" in order to maintain the control of the device (FIG. 12). On the other hand, in the protected asset evaluation list (b), the importance levels of the servo function and the control instruction data of the servo protected asset are as high as "5" in order to reliably stop the device (FIG. 13).

Returning to FIG. 11, the threat-scenario creating part 632 presents to the user the protected asset list created in step S202 (step S203). The threat-scenario creating part 632 determines whether confirmation is obtained from the user on the protected asset list presented in step S203 (step S204).

When confirmation is obtained from the user (YES in step S204), the threat-scenario creating part 632 completes the creation by taking the created protected asset list as a protected asset evaluation list (step S205). When confirmation is not obtained from the user (NO in step S204), the threat-scenario creating part 632 receives a modification of the protected asset list by the user (step S206). The threat-scenario creating part 632 completes the creation by taking the protected asset list modified in step S206 as a protected asset evaluation list (step S205).

After the protected asset evaluation list is created, the threat-scenario creating part 632 creates a threat scenario as shown in FIG. 8 (step S103). When creating the threat scenario in step S103, it is necessary for the threat-scenario creating part 632 to first create a threat list.

Figure 14:
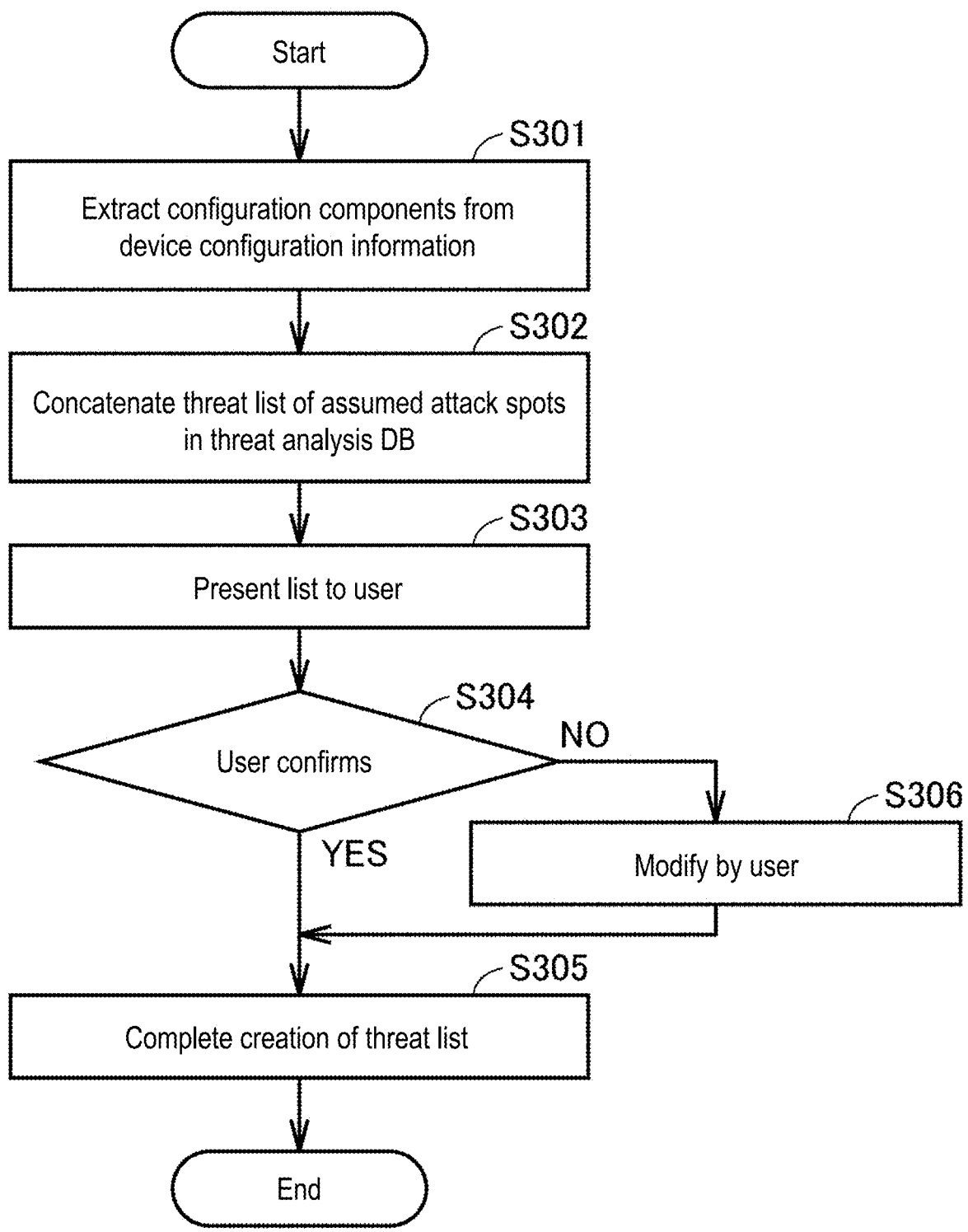
FIG. 14 is a flowchart showing a processing procedure of creating a threat list by the support device according to this embodiment.

The creation process of the threat list will be described in more detail. FIG. 14 is a flowchart showing a processing procedure of creating a threat list by the support device according to this embodiment. First, the threat-scenario creating part 632 extracts configuration components from the device configuration information (step S301). The threat-scenario creating part 632 concatenates a threat list of assumed attack spots in the threat analysis database 6106 for the configuration components extracted in step S301 (step S302).

For example, in the case of the semiconductor manufacturing device shown in (a) of FIG. 10, the device configuration includes an HMI, a PLC, a camera, and servos. Therefore, the threat-scenario creating part 632 takes out and concatenates a threat list of assumed attack spots that are predetermined for the protected assets of the HMI, the PLC, the camera, and the servo from the threat list for each attack spot in the threat analysis database 6106. FIG. 15 is a view showing an example of a threat list created by the support device according to this embodiment. FIG. 15 shows a threat list (a) in the case of the semiconductor manufacturing device shown in (a) of FIG. 10. As assumed attack spots for the protected assets of the HMI, the PLC, the camera, and the servo, the threat list (a) contains threats, target attributes, and threat levels of an external network, an unauthorized component connection, a memory card, a maintenance PC, a camera, and a servo.

Here, in this specification, "threat" means any event that prevents the equipment or machine from operating normally. In a control device centered on a PLC, typical threats may include threats from four aspects: (1) attack from a higher-level device such as a database, (2) attack from a field device, (3) attack via a support device, and (4) attack via a storage medium (e.g., a memory card) mounted on the control device. In addition, for all physical ports mounted on the control device, there is a security risk of being attacked.

For example, the assumed attack spot of the external network shown in FIG. 15 is classified into "(1) attack from a higher-level device such as a database", and specific threats include "communication DoS (distributed denial of service) attack", "communication data eavesdropping", and "communication data tampering". "Communication DoS attack" is an attack that sends a large number of packets to the communication address of an attack target and only affects the communication function with the outside, and it is often possible to operate the device itself. Therefore, in "communication DoS attack", the target attribute is "function" and the threat level is set to "3".

"Communication data eavesdropping" is an attack that intercepts communication via a network device to snoop on the data during communication, and only leaks information and does not affect the function of the device. Therefore, in "communication data eavesdropping", the target attribute is "information" and the threat level is set to "4". "Communication data tampering" is an attack that tampers with data during communication via a network device and is a threat to information. In "communication data tampering", the target attribute is "information" and the threat level is set to "2".

Further, the assumed attack spot of the memory card shown in FIG. 15 is classified into "(4) attack via a storage medium (e.g., a memory card) mounted on the control device", and specific threats include "firmware tampering" and "user program theft". "Firmware tampering" is, for example, an attack that tampers with the updated firmware of the control unit 100 to write a program of unauthorized operation, and is a threat to information. Therefore, in "firmware tampering", the target attribute is "information" and the threat level is set to "4". "User program theft" is an attack that steals a user's program and reuses it on another machine, and is an information leak. Therefore, in "user program theft", the target attribute is "information" and the threat level is set to "4".

Further, the assumed attack spot of the maintenance PC shown in FIG. 15 is classified into "(3) attack via a support device", and specific threats include "malware caused malfunction", "data theft", and "communication data tampering". "Malware caused malfunction" is, for example, an attack that infects the control unit 100 with malware to cause the control unit 100 to malfunction, and is a threat to function. Therefore, in "malware caused malfunction", the target attribute is "function" and the threat level is set to "4". "Data theft" is an attack that steals data of a device and reuses it on another machine, and is an information leak. Therefore, in "data theft", the target attribute is "information" and the threat level is set to "4". "Communication data tampering" is an attack that tampers with data during communication via a network device and is a threat to information. In "communication data tampering", the target attribute is "information" and the threat level is set to "3".

Further, the assumed attack spots of the camera and the servo shown in FIG. 15 are classified into "(2) attack from a field device", and specific threats include "camera hijacking", "screen tampering", "servo function stop", and "servo control data tampering". "Camera hijacking" is an attack on the control unit 100 by a user who does not have the operation authority but maliciously operates the camera, and is a threat to the function of the control unit 100. Therefore, in "camera hijacking", the target attribute is "function" and the threat level is set to "3".

"Screen tampering" is an attack that tampers with a screen captured by a camera and is a threat to information. In "screen tampering", the target attribute is "information" and the threat level is set to "1". "Servo function stop" is an attack in which a user without operation authority maliciously stops the servo function and hinders the control unit 100 from performing servo control, and is a threat to the function of the control unit 100. Therefore, in "servo function stop", the target attribute is "function" and the threat level is set to "3". "Servo control data tampering" is an attack that tampers with the data required for servo control and is a threat to information. In "servo control data tampering", the target attribute is "information" and the threat level is set to "2".

Further, in the case of the press device shown in (b) of FIG. 10, the device configuration includes an HMI, a PLC, and servos. Therefore, the threat-scenario creating part 632 takes out and concatenates a threat list of assumed attack spots that are predetermined for the protected assets of the HMI, the PLC, and the servo from the threat list for each attack spot in the threat analysis database 6106. FIG. 16 is a view showing another example of the threat list created by the support device according to this embodiment. FIG. 16 shows a threat list (b) in the case of the press device shown in (b) of FIG. 10. As assumed attack spots for the protected assets of the HMI, the PLC, and the servo, the threat list (b) contains threats, target attributes, and threat levels of an external network, an unauthorized component connection, a memory card, a maintenance PC, and a servo.

Since the important items differ between the semiconductor manufacturing device and the press device in the threat list (a) and the threat list (b), the threat level contained in the same threat also differs. For example, in the threat list (b), the threat levels for the threats of the memory card and the maintenance PC are as high as "5" in order to reliably stop the device (FIG. 16).

Returning to FIG. 14, the threat-scenario creating part 632 presents the threat list created in step S302 to the user (step S303). The threat-scenario creating part 632 determines whether confirmation from the user on the threat list presented in step S303 is obtained (step S304).

When confirmation is obtained from the user (YES in step S304), the threat-scenario creating part 632 completes the creation with the presented threat list (step S305). When confirmation is not obtained from the user (NO in step S304), the threat-scenario creating part 632 receives a modification of the threat list by the user (step S306). The threat-scenario creating part 632 completes the creation with the threat list modified in step S306 (step S305).

It has been described that the threat list contains the threat, the target attribute, and the threat level for each assumed attack spot as shown in FIG. 15 and FIG. 16. However, the information contained in the threat list is not limited thereto, and may also include, for example, software and hardware version information of the control unit 100 or the security unit 200. FIG. 17 is a view showing a modified example of the threat list created by the support device according to this embodiment. In a threat list (c) shown in FIG. 17, in addition to the information of the threat, the target attribute, and the threat level, software and hardware version information of the control unit 100 or the security unit 200 is added. Since the control unit 100 and the security unit 200 have different security vulnerabilities depending on the software and hardware version information, it is necessary to make the threat levels different depending on the version information.

Returning to FIG. 8, the threat-scenario creating part 632 creates a threat scenario from the threat list and the protected asset evaluation list in step S103. The threat-scenario creating part 632 links the threat list and the protected asset evaluation list by attributes to create a combined threat scenario. The threat scenario is listed for each item that combines the protected asset and the threat. The listed threat scenario is also hereinafter referred to as a threat scenario list. The threat-scenario creating part 632 calculates a risk value for each item of the threat scenario list to be created (step S104). The risk value is an index indicating a risk for a security threat, and is, for example, calculated by integrating the threat level of the threat list and the importance level of the protected asset evaluation list by a predetermined estimation method.

The threat-scenario creating part 632 determines whether the risk value of the created threat scenario list is equal to or higher than a countermeasure requirement risk level set by the user (step S105). When the risk value is equal to or higher than the countermeasure requirement risk level (YES in step S105), the threat-scenario creating part 632 performs a setting that a countermeasure is required for the item of the threat scenario list (step S106). On the other hand, when the risk value is lower than the countermeasure requirement risk level (NO in step S105), the threat-scenario creating part 632 performs a setting that a countermeasure is not required for the item of the threat scenario list (step S107).

The threat-scenario creating part 632 determines whether the estimation on the necessity of a countermeasure is completed for all the risk values of the created threat scenario list (step S108). When the estimation on the necessity of a countermeasure is not completed for all the risk values (NO in step S108), the threat-scenario creating part 632 returns the process to step S104. When the estimation on the necessity of a countermeasure is completed for all the risk values (YES in step S108), the threat-scenario creating part 632 sorts the items in the threat scenario list in a descending order of risk values and in an order according to the necessity of a countermeasure (step S109).

The threat scenario list created in step S103 to step S109 will be described with reference to specific examples. FIG. 18 is a view showing an example of a threat scenario list created by the support device according to this embodiment. In the threat scenario list shown in FIG. 18, a value "25" is contained as a risk value as a result of integrating the item of the device function having the importance level of "5" in the protected asset evaluation list and the item of the DoS attack having the threat level of "5". With the countermeasure requirement risk level being "15" or higher, this threat scenario list is sorted in a descending order of risk values. The sorted threat scenario list is shown at the lower side of FIG. 18.

Next, the process in which the countermeasure creating part 634 creates a countermeasure scenario containing a countermeasure for each of the protected assets of the controller system 1 according to the threat scenario list created by the threat-scenario creating part 632 and the countermeasures (threat countermeasure list) of the countermeasure database 6108 will be described. Returning to FIG. 9, first, the countermeasure creating part 634 extracts a countermeasure corresponding to each item of the threat scenario list from the countermeasure database 6108 (step S110). The countermeasures extracted from the countermeasure database 6108 include countermeasures that are based on the security functions of the security unit 200 and countermeasures that are based on operations not using the security functions. Of course, when the countermeasures stored in the countermeasure database 6108 are only countermeasures that are based on the security functions of the security unit 200, the countermeasures to be extracted may be only countermeasures that are based on the security functions of the security unit 200.

To take a countermeasure that is based on the security function selected from the threat countermeasure list of the countermeasure database 6108, the countermeasure creating part 634 determines whether a security unit 200 having a version equal to or higher than the version required by the security unit is provided (step S111). When the version is equal to or higher than the required version (YES in step S111), the countermeasure creating part 634 determines whether a resource capacity required by the security unit for taking the countermeasure that is based on the security function is equal to or less than or a resource capacity of the security unit 200 (step S112).

When the required resource capacity is equal to or less than the resource capacity of the security unit 200 (YES in step S112), the countermeasure creating part 634 sets this countermeasure that is based on the security function to an item in the threat scenario list (step S113). When the countermeasure that is based on the security function is set to an item in the threat scenario list, the countermeasure creating part 634 subtracts a resource capacity of the set countermeasure that is based on the security function from the resource capacity of the security unit 200 (step S114).

In the case of a version lower than the required version (NO in step S111), or in the case where the required resource capacity is greater than the resource capacity of the security unit 200 (NO in step S112), the countermeasure creating part 634 sets a countermeasure that is based on an operation not using the security function to an item in the threat scenario list (step S115).

The countermeasure creating part 634 determines whether the setting of a countermeasure is completed for all the items of the threat scenario list (step S116). When the setting of a countermeasure is not completed for all the items (NO in step S116), the countermeasure creating part 634 returns the process to step S111. When the setting of a countermeasure is completed for all the items (YES in step S116), the countermeasure creating part 634 creates a countermeasure scenario in which the setting of a countermeasure is completed for all the items of the threat scenario list. According to the countermeasure scenario created by the countermeasure creating part 634, the security setting part 636 outputs setting data of security functions (security function setting data) to the security unit 200 (step S117). In step S117, the countermeasure result output part 638 outputs a threat analysis result including the countermeasure scenario created by the countermeasure creating part 634 to the user as a threat analysis result report.

The countermeasure scenario created in step S110 to step S116 will be described with reference to specific examples. FIG. 19 is a view showing an example of a countermeasure scenario created by the support device according to this embodiment. In a countermeasure scenario (b) shown in FIG. 19, countermeasures selected from a threat countermeasure list (a) of the countermeasure database 6108 are set to the items of the threat scenario list shown in FIG. 18. In addition to the information of the threat scenario list, the countermeasure scenario (b) contains information including a countermeasure, a resource, an effect threat level, and a post-countermeasure risk value. For example, in the item of "device function"×"DoS attack", "IDS (intrusion detection system)-isolation" is contained as the countermeasure, "50" is contained as the resource, "1" is contained as the effect threat level, and "5" is contained as the post-countermeasure risk value. Here, "IDS-isolation" is a countermeasure that blocks communication and isolates from other equipment by an intrusion detection system, which is one of the security functions of the security unit 200.

In the countermeasure scenario (b), the necessity of a countermeasure is determined based on whether the risk value is equal to or higher than the countermeasure requirement risk level of "10", and assuming that the device version is 1.3 and the resource capacity of the security unit 200 may be equipped with all the functions, countermeasures are set for all the items equal to or higher than the countermeasure requirement risk level of "10". However, in reality, the resource capacity of the security unit 200 is limited, and the selected countermeasures differ according to the resource capacity. FIG. 20 is a view showing an example of a countermeasure scenario created by the support device according to this embodiment when the resource capacity is 50. Since the device version is 1.0 and the resource capacity is 50, a countermeasure scenario (c) shown in FIG. 20 is different from the countermeasure scenario (b), and in the item "device function"ב"DoS attack", "filtering" is contained as the countermeasure, "10" is contained as the resource, "2" is contained as the effect threat level, and "10" is contained as the post-countermeasure risk value. In the countermeasure scenario (c), in the item "user program"ב"eavesdropping", "encryption" is contained as the countermeasure, "20" is contained as the resource, "2" is contained as the effect threat level, and "8" is contained as the post-countermeasure risk value.

FIG. 21 is a view showing an example of a countermeasure scenario created by the support device according to this embodiment when the resource capacity is 100. Since the device version is 1.2 and the resource capacity is 100, a countermeasure scenario (d) shown in FIG. 21 is different from the countermeasure scenario (c), and in the item "device function"ב"DoS attack", "IDS-isolation" is contained as the countermeasure, "50" is contained as the resource, "1" is contained as the effect threat level, and "5" is contained as the post-countermeasure risk value. In the countermeasure scenario (d), in the item of "user program"ב"eavesdropping", "encryption" is contained as the countermeasure, "20" is contained as the resource, "2" is contained as the effect threat level, and "8" is contained as the post-countermeasure risk value.

FIG. 22 is a view showing an example of a countermeasure scenario created by the support device according to this embodiment when the resource capacity is 20. Since the device version is 1.2 and the resource capacity is 20, a countermeasure scenario (e) shown in FIG. 22 is different from the countermeasure scenario (b), and in the item "device function"ב"DoS attack", "filtering" is contained as the countermeasure, "10" is contained as the resource, "2" is contained as the effect threat level, and "10" is contained as the post-countermeasure risk value. Further, in the countermeasure scenario (e), since the remaining resource capacity is small, in the item "user program"ב"eavesdropping", a countermeasure that is based on the operation is selected instead of a countermeasure that is based on the security function. In the countermeasure scenario (e), in the item "user program"ב"eavesdropping", "blocking wired communication/port" is contained as the countermeasure, "0" is contained as the resource, "2" is contained as the effect threat level, and "8" is contained as the post-countermeasure risk value.

Since the countermeasures (e.g., IDS-isolation, filtering, etc.) that are based on the security functions of the security unit 200 use the resource of the security unit 200, it is necessary to take countermeasures within the resource capacity. On the other hand, since the countermeasures (e.g., blocking wired communication/port) that are based on the operations do not use the resource of the security unit 200, the countermeasures may be taken without worrying about the resource capacity. In the countermeasure scenarios shown in FIG. 19 to FIG. 22, although the necessity of the countermeasure is determined based on whether the risk value of each item is equal to or higher than the countermeasure requirement risk level, the countermeasure may also be set for all the items regardless of the risk value.

Next, the threat analysis result report created in step S117 will be described with reference to specific examples. FIG. 23 is a view showing an example of a threat analysis result report created by the support device according to this embodiment. The threat analysis result report shown in FIG. 23 records a device configuration view, attack ports, and a list of assumed threats and is, for example, a report for submission to the IT department of a factory. (a) of FIG. 23 shows a device configuration, (b) of FIG. 23 shows a threat scenario list, and (c) of FIG. 23 shows a countermeasure scenario. In particular, in the threat scenario list shown in (b) of FIG. 23, since the numbers of the attack ports are labeled in the view showing the device configuration in (a) of FIG. 23, even a person without security knowledge can easily recognize a security threat.

FIG. 24 is a view showing another example of the threat analysis result report created by the support device according to this embodiment. The threat analysis result report shown in FIG. 24 records the countermeasures that are based on the operations in an easy-to-understand manner, and is, for example, a report for factory operators. (a) of FIG. 24 shows a view in which information on functions (security functions) used in the security unit 200 is added to the countermeasure scenario, and (b) of FIG. 24 shows a countermeasure list of countermeasures that are based on the operations. In particular, in (b) of FIG. 24, countermeasures that are based on the operations may be shown in a list, and their implementation contents are also recorded in detail. For example, the implementation content of the item "blocking wired communication/port" is recorded as "performing locking so that the communication port cannot be connected". In addition, in the countermeasure list of countermeasures that are based on the operations, the spots (e.g., the PLC) at which the countermeasures are taken are also specified.

Figure 25:
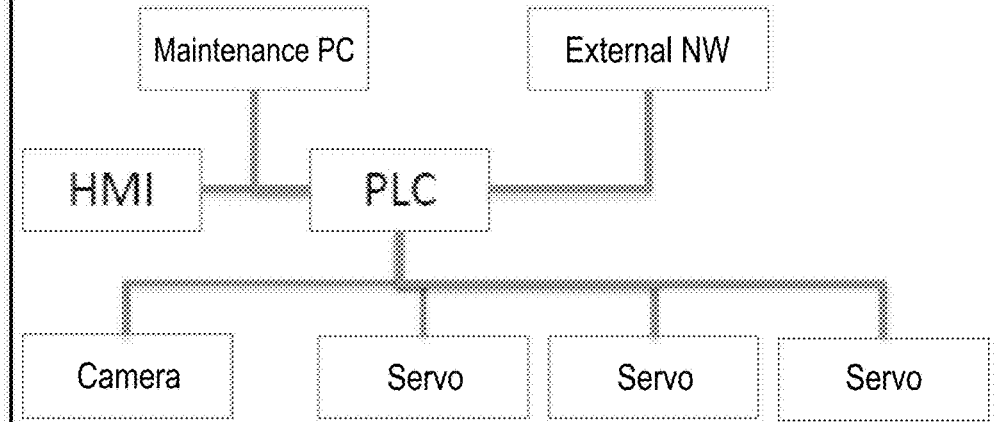
FIG. 25 is a view showing an example of device configuration information displayed by the support device according to this embodiment.

Next, a screen displayed on a display part (e.g., an LCD display) of the support device 600 in the process described with reference to FIG. 8 and FIG. 9 will be described. FIG. 25 is a view showing an example of device configuration information displayed by the support device according to this embodiment. (a) of FIG. 25 shows an example of a screen in which the user selects the device type (e.g., a semiconductor manufacturing device, a press device, etc.). (b) of FIG. 25 shows an example of a device configuration view when the device type is a semiconductor manufacturing device. In the support device 600, the device configuration created from the device configuration information and the protected asset information acquired from the controller system 1 in the process of step S101 may be presented to the user on a screen shown in (b) of FIG. 25. Therefore, the user may visually learn about the device configuration.

FIG. 26 is a view showing an example of a protected asset evaluation list displayed by the support device according to this embodiment. In the support device 600, the protected asset evaluation list created in the process of step S102 may be presented to the user on a screen shown in FIG. 26. Further, the support device 600 may receive addition of the list and edition of the importance level for the displayed protected asset evaluation list as necessary.

FIG. 27 is a view showing an example of a threat list displayed by the support device according to this embodiment. In the support device 600, the threat list created in the process of step S103 may be presented to the user on a screen shown in FIG. 27. Further, the support device 600 may receive addition of the list and edition of the threat level for the displayed threat list as necessary.

FIG. 28 is a view showing an example of setting of a risk value estimation method displayed by the support device according to this embodiment. In the support device 600, the setting of the risk value estimation method of the threat scenario list created in the process of step S104 may be presented to the user on a screen shown in FIG. 28. (a) of FIG. 28 shows an example of a screen in which the user selects the method for estimating the risk value (e.g., importance (importance level)×threat level, etc.). (b) of FIG. 28 shows an example of a screen of setting a weight when estimating the risk value by "importance (importance level)×threat level". Here, the risk value is not only obtained by simply integrating the importance (importance level) and the threat level, but may also be obtained by setting weights on each value and integrating them. For example, the risk value may be estimated by doubling the threat level. Further, as another estimation method, the risk value may also be estimated using general risk evaluation methods for threat analysis such as the common vulnerability scoring system (CVSS) or the risk scoring methodology for automotive system (RSMA).

FIG. 29 is a view showing an example of a threat scenario list displayed by the support device according to this embodiment. In the support device 600, the threat scenario list created in the process of step S109 may be presented to the user on a screen shown in FIG. 29. Further, the support device 600 may receive a countermeasure requirement risk level for the displayed threat scenario list.

FIG. 30 is a view showing an example of selection of a countermeasure policy displayed by the support device according to this embodiment. In the support device 600, setting of a policy (e.g., a default (MAX) setting) of the processes of step S111 to step S114 may be presented to the user on a screen shown in FIG. 30. In the default (MAX) setting, countermeasures are selected so as to maximize the allowable range of the resource capacity of the security unit 200.

FIG. 31 is a view showing an example of a threat countermeasure list displayed by the support device according to this embodiment. In the support device 600, the threat countermeasure list read from the countermeasure database 6108 in the processes of step S111 to step S114 may be presented to the user on a screen shown in FIG. 31. Further, the support device 600 may receive edition of the countermeasure technique, the resource, etc. for the displayed threat countermeasure list as necessary.

FIG. 32 is a view showing an example of a countermeasure scenario displayed by the support device according to this embodiment. In the support device 600, the countermeasure scenario created in the process of step S117 may be presented to the user on a screen shown in FIG. 32. Therefore, in the support device 600, the user may confirm the created countermeasure scenario.

Figure 33:
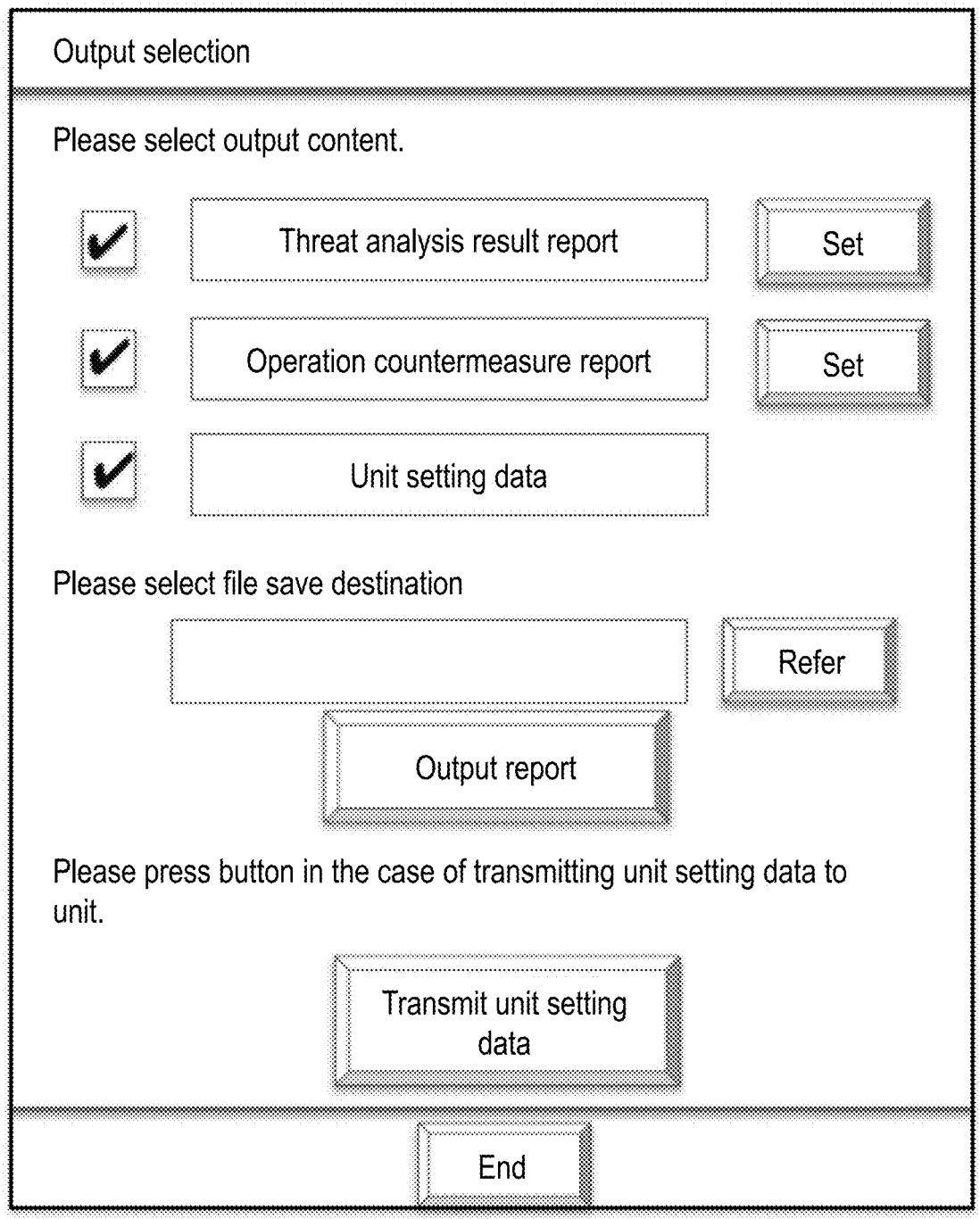
FIG. 33 is a view showing an example of selection of an output content displayed by the support device according to this embodiment.

FIG. 33 is a view showing an example of selection of an output content displayed by the support device according to this embodiment. In the support device 600, a screen for setting the content to be outputted in step S117 may be presented to the user on a screen shown in FIG. 33. In the support device 600, it is possible to set to output, for example, a threat analysis result report, an operation countermeasure report, and unit setting data.

E. APPENDIX

The embodiment as described above includes the following technical concepts.

[Configuration 1]
A control system including:
a controller system (1) that controls a control target; and
a support device (600) that supports setting of the controller system (1),
wherein the controller system (1) includes:
a control unit (100) that executes control calculation for controlling the control target; and
a security unit (200) connected to the control unit (100) and responsible for a security function for the controller system (1), and the support device (600) includes:
a system-configuration input part (630) that acquires a device configuration and protected assets from the controller system (1);
a threat analysis database (6106) that stores in advance an importance level for the protected assets of the controller system (1) and a threat level for security threats;
a threat-scenario creating part (632) that creates a threat scenario from the importance level and the threat level of the threat analysis database (6106) according to the device configuration and the protected assets acquired by the system-configuration input part (630);
a countermeasure database (6108) that stores in advance countermeasures corresponding to the security threats;
a countermeasure creating part (634) that creates a countermeasure scenario containing a countermeasure for each of the protected assets of the controller system (1) according to the threat scenario created by the threat-scenario creating part (632) and the countermeasures of the countermeasure database (6108); and
a security setting part (636) that outputs a setting data of the security function to the security unit (200) according to the countermeasure scenario created by the countermeasure creating part (634).

[Configuration 2]
The control system according to configuration 1, where the support device (600) further includes a countermeasure result output part (638) that outputs a countermeasure report containing information of at least one of the threat scenario and the countermeasure scenario.

[Configuration 3]
The control system according to configuration 1 or 2, where in the threat analysis database (6106), the threat level for the security threats differs depending on a device type of the controller system (1).

[Configuration 4]
The control system according to any one of configurations 1 to 3, where the threat scenario contains a risk value estimated by a predetermined method for each of the protected assets of the controller system (1) and the security threats.

[Configuration 5]
The control system according to configuration 4, where the countermeasure creating part (634) creates the countermeasure scenario for each of the protected assets of the controller system (1) and the security threats of which the risk value contained in the threat scenario is equal to or higher than a predetermined value.

[Configuration 6]
The control system according to any one of configurations 1 to 5, where the countermeasure database (6108) stores a countermeasure that is based on the security function of the security unit (200) and a countermeasure that is based on an operation not using the security function respectively as the countermeasures corresponding to the security threats.

[Configuration 7]
The control system according to any one of configurations 1 to 6, where the countermeasure creating part (634) creates the countermeasure scenario by selecting a countermeasure that is based on the security function of the security unit (200) according to a resource of the controller system (1).

[Configuration 8]

The control system according to configuration 7, where the countermeasure selected by the countermeasure creating part (634) differs depending on software and hardware versions of each of devices constituting the controller system (1).

[Configuration 9]

The control system according to any one of configurations 6 to 8, where the countermeasure creating part (634) selects the countermeasure that is based on the operation to create the countermeasure scenario when a resource of the controller system (1) is insufficient.

[Configuration 10]

A setting method of a controller system (1) for setting a setting data of a security function for the controller system (1), where the controller system (1) includes a control unit (100) that executes control calculation for controlling a control target and a security unit (200) connected to the control unit (100) and responsible for the security function for the controller system (1), the setting method including:
- a step of acquiring a device configuration and protected assets from the controller system (1);
- a step of creating a threat scenario from an importance level and a threat level stored in advance in a threat analysis database (6106) according to the device configuration and the protected assets that are acquired;
- a step of creating a countermeasure scenario containing a countermeasure for each of the protected assets of the controller system (1) according to the created threat scenario and countermeasures corresponding to security threats stored in advance in a countermeasure database (6108); and
- a step of outputting the setting data of the security function to the security unit (200) according to the created countermeasure scenario.

F. ADVANTAGES

According to the control system according to this embodiment, it is possible to analyze security threats by the support device and easily take countermeasures against the threats.

It should be considered that the embodiments disclosed herein are in all respects exemplary and not restrictive. The scope of the disclosure is shown by the scope of claims instead of the above description and is intended to include all modifications equivalent to the meaning and scope of the claims.

What is claimed is:

1. A control system comprising:
a controller system that controls a control target; and
a support device that supports setting of the controller system,
wherein the controller system comprises:
a control unit that executes control calculation for controlling the control target; and
a security unit connected to the control unit and responsible for a security function for the controller system, and
the support device comprises:
a system-configuration input part that acquires a device configuration and protected assets from the controller system;
a threat analysis database that stores in advance an importance level for the protected assets of the controller system and a threat level for security threats, wherein the importance level is an index indicating an importance of the protected assets constituting the controller system, and the threat level is an index indicating a security threat to the controller system;
a threat-scenario creating part that creates a threat scenario from the importance level and the threat level of the threat analysis database according to the device configuration and the protected assets acquired by the system-configuration input part;
a countermeasure database that stores in advance countermeasures corresponding to the security threats;
a countermeasure creating part that creates a countermeasure scenario containing a countermeasure for each of the protected assets of the controller system according to the threat scenario created by the threat-scenario creating part and the countermeasures of the countermeasure database; and
a security setting part that outputs a setting data of the security function to the security unit according to the countermeasure scenario created by the countermeasure creating part,
wherein a higher importance level of the protected assets refers to the protected assets being relatively preferentially maintained according to a purpose of the control target being controlled, and a lower importance level of the protected assets refers to the protected assets being relatively less-preferentially maintained according to the purpose of the control target being controlled, and
a higher threat level refers to a relatively higher threat of an equipment or machine included in the controller system being prevented from operating normally, and a lower threat level refers to a relatively lower threat of the equipment or machine included in the controller system being prevented from operating normally.

2. The control system according to claim 1, wherein the support device further comprises a countermeasure result output part that outputs a countermeasure report containing information of at least one of the threat scenario and the countermeasure scenario.

3. The control system according to claim 2, wherein the threat scenario contains a risk value estimated by a predetermined method for each of the protected assets of the controller system and the security threats,
wherein the risk value is an index indicating a risk for each of the security threats and is calculated by integrating the threat level and the importance level.

4. The control system according to claim 2, wherein the countermeasure database stores a countermeasure that is based on the security function of the security unit and a countermeasure that is based on an operation not using the security function respectively as the countermeasures corresponding to the security threats.

5. The control system according to claim 2, wherein the countermeasure creating part creates the countermeasure scenario by selecting a countermeasure that is based on the security function of the security unit according to a resource of the security unit.

6. The control system according to claim 2, wherein in the threat analysis database, the threat level for the security threats differs depending on a device type of the controller system.

7. The control system according to claim 1, wherein in the threat analysis database, the threat level for the security threats differs depending on a device type of the controller system.

8. The control system according to claim 7, wherein the threat scenario contains a risk value estimated by a predetermined method for each of the protected assets of the controller system and the security threats, wherein the risk value is an index indicating a risk for each of the security threats and is calculated by integrating the threat level and the importance level.

9. The control system according to claim 7, wherein the countermeasure database stores a countermeasure that is based on the security function of the security unit and a countermeasure that is based on an operation not using the security function respectively as the countermeasures corresponding to the security threats.

10. The control system according to claim 7, wherein the countermeasure creating part creates the countermeasure scenario by selecting a countermeasure that is based on the security function of the security unit according to a resource of the security unit.

11. The control system according to claim 1, wherein the threat scenario contains a risk value estimated by a predetermined method for each of the protected assets of the controller system and the security threats,
wherein the risk value is an index indicating a risk for each of the security threats and is calculated by integrating the threat level and the importance level.

12. The control system according to claim 11, wherein the countermeasure creating part creates the countermeasure scenario for each of the protected assets of the controller system and the security threats of which the risk value contained in the threat scenario is equal to or higher than a predetermined value.

13. The control system according to claim 12, wherein the countermeasure database stores a countermeasure that is based on the security function of the security unit and a countermeasure that is based on an operation not using the security function respectively as the countermeasures corresponding to the security threats.

14. The control system according to claim 11, wherein the countermeasure database stores a countermeasure that is based on the security function of the security unit and a countermeasure that is based on an operation not using the security function respectively as the countermeasures corresponding to the security threats.

15. The control system according to claim 11, wherein the countermeasure creating part creates the countermeasure scenario by selecting a countermeasure that is based on the security function of the security unit according to a resource of the security unit.

16. The control system according to claim 1, wherein the countermeasure database stores a countermeasure that is based on the security function of the security unit and a countermeasure that is based on an operation not using the security function respectively as the countermeasures corresponding to the security threats.

17. The control system according to claim 16, wherein the countermeasure creating part selects the countermeasure that is based on the operation to create the countermeasure scenario when a resource of the security unit is insufficient.

18. The control system according to claim 1, wherein the countermeasure creating part creates the countermeasure scenario by selecting a countermeasure that is based on the security function of the security unit according to a resource of the security unit.

19. The control system according to claim 18, wherein the countermeasure selected by the countermeasure creating part differs depending on software and hardware versions of each of devices constituting the controller system.

20. A setting method of a controller system for setting a setting data of a security function for the controller system, wherein the controller system comprises a control unit that executes control calculation for controlling a control target and a security unit connected to the control unit and responsible for the security function for the controller system, the setting method comprising:
a step of acquiring a device configuration and protected assets from the controller system;
a step of creating a threat scenario from an importance level and a threat level stored in advance in a threat analysis database according to the device configuration and the protected assets that are acquired, wherein the importance level is an index indicating an importance of the protected assets constituting the controller system, and the threat level is an index indicating a security threat to the controller system;
a step of creating a countermeasure scenario containing a countermeasure for each of the protected assets of the controller system according to the created threat scenario and countermeasures corresponding to security threats stored in advance in a countermeasure database; and
a step of outputting the setting data of the security function to the security unit according to the created countermeasure scenario,
wherein a higher importance level of the protected assets refers to the protected assets being relatively preferentially maintained according to a purpose of the control target being controlled, and a lower importance level of the protected assets refers to the protected assets being relatively less-preferentially maintained according to the purpose of the control target being controlled, and
a higher threat level refers to a relatively higher threat of an equipment or machine included in the controller system being prevented from operating normally, and a lower threat level refers to a relatively lower threat of the equipment or machine included in the controller system being prevented from operating normally.

* * * * *